US012309301B2

United States Patent
Wan et al.

(10) Patent No.: US 12,309,301 B2
(45) Date of Patent: *May 20, 2025

(54) METHOD AND APPARATUS FOR OPERATING BLOCKCHAIN SYSTEM, DEVICE AND STORAGE MEDIUM

(71) Applicant: BEIJING BAIDU NETCOM SCIENCE TECHNOLOGY CO., LTD., Beijing (CN)

(72) Inventors: Chunhui Wan, Beijing (CN); Yuan Wang, Beijing (CN); Wei Xiao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 533 days.

This patent is subject to a terminal disclaimer.

(21) Appl. No.: 17/657,355

(22) Filed: Mar. 30, 2022

(65) Prior Publication Data

US 2022/0224545 A1 Jul. 14, 2022

(30) Foreign Application Priority Data

Jun. 11, 2021 (CN) .......................... 202110652768.7

(51) Int. Cl.
*H04L 9/00* (2022.01)
*H04L 9/32* (2006.01)
(Continued)

(52) U.S. Cl.
CPC .............. *H04L 9/50* (2022.05); *H04L 9/3236* (2013.01); *H04L 9/3247* (2013.01);
(Continued)

(58) Field of Classification Search
CPC ... H04L 9/3247; H04L 9/3236; H04L 67/104; H04L 9/38; H04L 9/50; H04L 2209/56;
(Continued)

(56) References Cited

U.S. PATENT DOCUMENTS

2019/0121988 A1* 4/2019 van de Ruit .......... H04L 9/0825
2019/0199516 A1* 6/2019 Carver .................. H04L 9/3297
(Continued)

FOREIGN PATENT DOCUMENTS

| CN | 109558115 A | 4/2019 |
| CN | 109726206 A | 5/2019 |

(Continued)

OTHER PUBLICATIONS

"First Chinese Office Action, The State Intellectual Property Office of People's Republic of China, issued to CN Application No. 202110652768.7, 12 pages."
(Continued)

*Primary Examiner* — Shaqueal D Wade-Wright
(74) *Attorney, Agent, or Firm* — Hunton Andrews Kurth LLP

(57) ABSTRACT

Provided are a method and apparatus for operating blockchain system, a device and a storage medium. The method is described below. To-be-processed blockchain data is processed through a kernel engine of a blockchain system, a kernel component call request is generated based on a kernel component interface during the processing process, and a kernel component is called according to the kernel component call request, where at least one kernel component is provided. The kernel component call request is executed through the kernel component to execute processing of a set component function and satisfy a processing requirement for the to-be-processed blockchain data.

15 Claims, 9 Drawing Sheets

(51) Int. Cl.
*H04L 67/104* (2022.01)
*G06F 9/46* (2006.01)
*G06F 21/64* (2013.01)
*H04L 67/1097* (2022.01)

(52) U.S. Cl.
CPC ............ *H04L 67/104* (2013.01); *G06F 9/466* (2013.01); *G06F 21/64* (2013.01); *H04L 67/1097* (2013.01); *H04L 2209/56* (2013.01)

(58) Field of Classification Search
CPC ... H04L 67/1097; H04L 67/133; G06F 9/466; G06F 9/45558; G06F 9/547; G06F 21/64; G06F 2009/45595; G06Q 40/04
See application file for complete search history.

(56) References Cited

U.S. PATENT DOCUMENTS

| | | | |
|---|---|---|---|
| 2019/0260574 A1 | 8/2019 | Shi et al. | |
| 2020/0175156 A1* | 6/2020 | Bhamidipati | ...... G06Q 20/3678 |
| 2020/0177372 A1* | 6/2020 | Bhamidipati | ............. H04L 9/50 |
| 2020/0412525 A1* | 12/2020 | Katsak | ...................... H04L 9/50 |

FOREIGN PATENT DOCUMENTS

| | | |
|---|---|---|
| CN | 110263085 A | 9/2019 |
| CN | 111242620 A | 6/2020 |
| CN | 112631649 A | 4/2021 |
| CN | 112734576 A | 4/2021 |

OTHER PUBLICATIONS

"First Chinese Search Report, The State Intellectual Property Office of People's Republic of China, issued to CN Application No. 202110652768.7, 1 page."

"Liu, M., et al., "Distributed Trusted Network Connection Architecture Based on Blockchain" Journal of Software, 2019, 30 (8): pp. 2314-2336, 23 pages."

"Luchun, L., "Looking back at the development of Blockchain in China in 2018", Monographic Research, 2018, Software and Integrated Circuit, pp. 76-98, 23 pages."

"Second Chinese Office Action, The State Intellectual Property Office of People's Republic of China, issued to CN Application No. 202110652768.7, 14 pages."

"Supplemental Chinese Search Report, The State Intellectual Property Office of People's Republic of China, issued to CN Application No. 202110652768.7, 1 page."

* cited by examiner

METHOD AND APPARATUS FOR OPERATING BLOCKCHAIN SYSTEM, DEVICE AND STORAGE MEDIUM

CROSS-REFERENCE TO RELATED APPLICATION(S)

This application claims priority to Chinese Patent Application No. 2021106652768.7 filed Jun. 11, 2021, the disclosure of which is incorporated herein by reference in its entirety.

TECHNICAL FIELD

The present disclosure relates to the field of computer technologies and, in particular, to the blockchain technology.

BACKGROUND

The blockchain industry continues to develop rapidly, and main application scenarios of the blockchain technology in early stages of development are still focused on digital currencies and games. At present, the blockchain technology has entered a new stage of comprehensively exploring and empowering the industry from serving as the underlying technology that supports digital currencies.

At present, the mainstream blockchain implementation schemes basically have its clear application scenarios. Most of the conventional schemes are oriented to application scenarios of digital currencies, and thus they are more suitable for the application of digital currencies. Therefore, in actual business scenarios, the conventional schemes will encounter problems in applicability, the solution of which requires in-depth reconstruction on the framework, and this reconstruction requires high costs and technical thresholds.

However, the mode in which the in-depth reconstruction is performed on the framework has problems of the reconstruction difficulty and high cost. In addition, after the reconstruction is completed, the latest update corresponding to the framework cannot be automatically followed up.

SUMMARY

The present disclosure provides a method and apparatus for operating blockchain system, a device and a storage medium, so as to improve the applicability of the blockchain to different scenarios and reduce the development difficulty and cost.

According to an aspect of the present disclosure, A method for operating a blockchain system is provided. The method includes steps described below.

To-be-processed blockchain data is processed through a kernel engine of the blockchain system, a kernel component call request is generated based on a kernel component interface during the processing process of the to-be-processed blockchain data, and a kernel component corresponding to the kernel component call request is called according to the kernel component call request, where at least one kernel component is provided.

The kernel component call request is executed through the kernel component to execute processing of a set component function and satisfy a processing requirement for the to-be-processed blockchain data.

According to another aspect of the present disclosure, an apparatus for operating a blockchain system is provided. The apparatus includes a to-be-processed blockchain data processing module and a kernel component call request execution module.

The to-be-processed blockchain data processing module is configured to process, through a kernel engine of a blockchain system, to-be-processed blockchain data, generate a kernel component call request based on a kernel component interface during the processing process, and call a kernel component corresponding to the kernel component call request according to the kernel component call request, where at least one kernel component is provided.

The kernel component call request execution module is configured to execute, through the corresponding kernel component, the kernel component call request to execute processing of a set component function and satisfy a processing requirement for the to-be-processed blockchain data.

According to another aspect of the present disclosure, an electronic device is provided. The electronic device includes at least one processor and a memory communicatively connected to the at least one processor.

The memory stores instructions executable by the at least one processor to cause the at least one processor to perform the method for operating the blockchain system of any one of embodiments of the present disclosure.

According to another aspect of the present disclosure, a non-transitory computer-readable storage medium is further provided. The non-transitory computer-readable storage medium stores computer instructions for causing a computer to perform the method for operating the blockchain system according to any one of the embodiments of the present disclosure.

According to another aspect of the present disclosure, a computer program product is provided. The computer program product includes a computer program which, when executed by a processor, implements the method for operating the blockchain system of any one of the embodiments of the present disclosure.

According to the technical solution of the embodiments of the present disclosure, the extensibility and applicability of the blockchain implementation scheme may be improved, and thereby the development cost of the blockchain technology is reduced.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Figure 1:
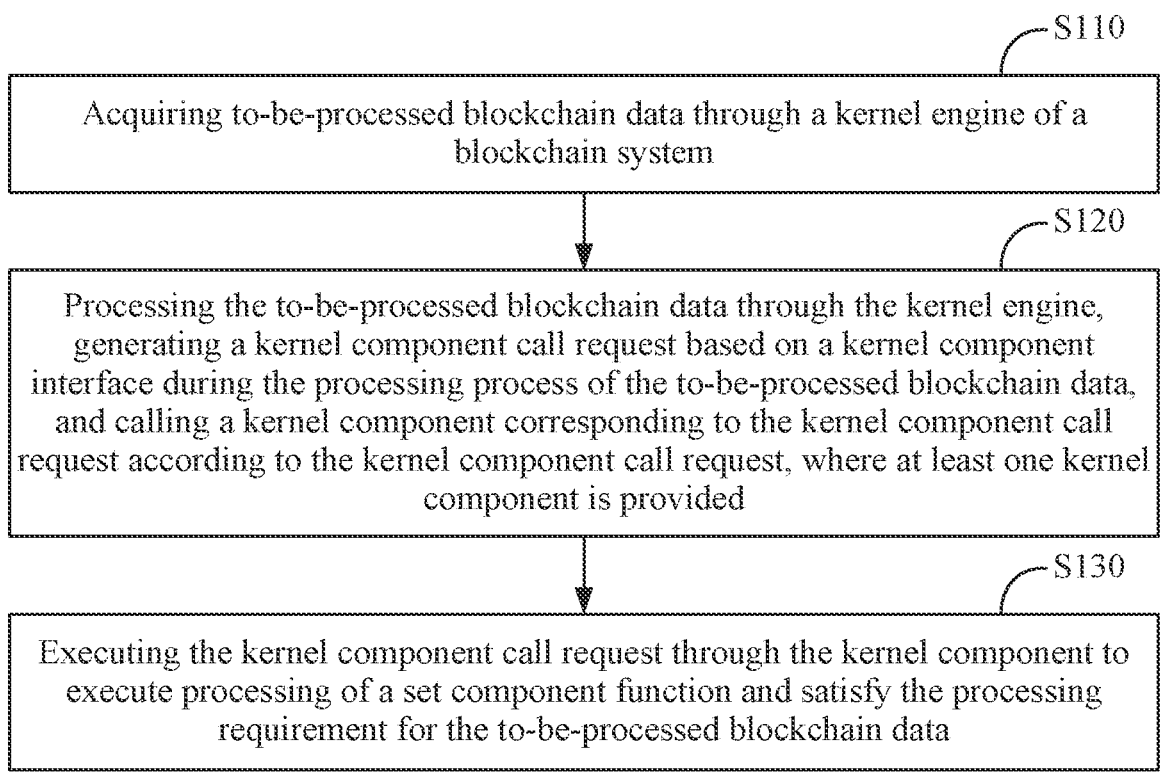
FIG. 1 is a diagram showing a method for operating a blockchain system according to an embodiment of the present disclosure.

Example embodiments of the present disclosure, including details of embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The method for operating the blockchain system provided by the embodiments of the present disclosure is provided on the basis of the blockchain kernel architecture constructed by the inventor.

A blockchain system as a whole may be divided into two parts, that is, the blockchain kernel architecture and the blockchain application layer, respectively. The blockchain application layer is provided for users to implement specific business requirements based on the blockchain system, and the blockchain application layer shields users from the complex blockchain underlying technology, so that a blockchain can be built to satisfy the business requirements as long as the users understand the basic principles of the blockchain. The server function of the blockchain application layer may be implemented by main programs of the blockchain system. The blockchain application layer may further include a client and an application programming interface (API) to provide a user interaction interface or interaction mechanism, so as to achieve interaction with the users. In a blockchain system, the business function of one or more blockchain application layers may be supported. The client or API of the application layer may interact with the blockchain kernel architecture through proprietary components. The proprietary component, for example, may implement monitoring services for set interaction ports.

The present disclosure pays more attention to the kernel architecture of the blockchain. The kernel architecture includes at least a kernel engine layer and a kernel component layer, and may further include a basic component layer. The kernel engine layer defines core flows of the blockchain kernel, that is, core flows of various kinds of business logic in the operation process of the blockchain, such as a deal processing flow, a miner block generation flow and a block synchronization flow. In the embodiments of the present disclosure, the so-called deal is a transaction request initiated by a blockchain user needing to be processed by a blockchain node based on the blockchain system, and the processing process is stored on chain. The transaction request is not limited to the deal business, and may be any application business required to be carried by the blockchain or any blockchain management transaction request. The so-called miner is a blockchain node that has the permission to generate blocks in a current block generation period and is not limited to the block generation node determined based on a proof of work (POW) consensus mechanism. Block generation nodes determined based on other consensus mechanisms may also be referred to as miners. In addition, the kernel engine adopts a read-write splitting design to reduce complexity, and may adopt independent-read components to implement read operations, enabling read operations to be individually extended. The kernel engine in the kernel engine layer may be extended and customized without invasion of framework codes or may be adjusted and customized based on lightweight codes by users according to scene requirements. That is, developers may develop the kernel engine based on the function of kernel components, without developing the kernel components separately.

The kernel component layer is the specific implementation of a kernel component programming specification, with the implementation of very complete standard kernel components are built in the kernel component layer. The standard kernel components include a ledger component, a consensus component, a contract component, a network component, an encryption component, a permission component and the like for developers of the kernel engine to select. At the same time, the developers may develop kernel components suitable for scenarios of the developers according to the kernel component programming specification at low cost, and seamlessly integrate the self-implemented kernel components into various kernel engines. The kernel component programming specification is a specification for abstracting kernel components. Kernel components are implemented according to the kernel component programming specification, so that a standard kernel component function interface may be provided for the kernel engine to call the kernel components, and thus the kernel engine may implement the call of the kernel components through the kernel component interface determined by a component adaptor (such as a consensus component adaptor, a contract component adaptor, a ledger component adaptor, a network component adaptor or a permission component adaptor) in the kernel engine layer, and then complete the processing of to-be-processed blockchain data through the kernel components. The kernel component interface may also be referred to as a kernel function interface, which is a function-level interface that the kernel components provide for the kernel engine to call. No matter what kind of kernel component it is, no matter how the function of the component is implemented internally, a normalized and unified kernel component interface may be provided to facilitate the call by the kernel engine.

The basic component layer is provided with basic public components that have nothing to do with the blockchain business, such as: a basic storage, a peer-to-peer (p2p) network library, a cryptography library, a codec library and a log library.

The blockchain kernel architecture provided by the present disclosure is an universal blockchain kernel framework that is brand-new, highly extendable and applicable to wide-area scenarios. The highly-modular design of this architecture ensures the loose coupling between modules, so that each module may be freely extended and replaced. Based on this architecture, users can develop a specific blockchain system with a very light weight according to requirements and preferences of a specific scene. According to this architecture, the difficulty of developing the blockchain system is reduced to that only part subdomain functions are extended according to scene requirements, so that the development cost of the blockchain technology is greatly reduced.

FIG. 1 is a diagram showing A method for operating a blockchain system according to an embodiment of the present disclosure. The embodiment is applicable to the case where to-be-processed blockchain data is processed by using a blockchain. The method for operating the blockchain system disclosed by the embodiment may be executed by an apparatus for operating the blockchain system. The apparatus may be implemented by software and/or hardware and configured in an electronic device having calculation and storage functions, for example, may be configured at a blockchain node. Referring to FIG. 1, the method for operating the blockchain system provided by the embodiment includes steps described below.

In step S110, to-be-processed blockchain data is acquired through a kernel engine of a blockchain system.

The kernel engine represents a core flow of the blockchain kernel. The to-be-processed blockchain data acquired by the kernel engine may be sent by the upper layer of the kernel engine, that is, the application layer, to the kernel engine after the application layer acquires the to-be-processed blockchain data from a user client. Alternatively, the to-be-processed blockchain data acquired by the kernel engine may be the to-be-processed blockchain data received by the kernel engine through a network component after to-be-processed blockchain data sent from the user client, or may be to-be-processed blockchain data received by the kernel engine through the network component after the to-be-processed blockchain data is generated during a blockchain system operation process, for example, a newly-generated block verification process and a block synchronization process, and received by the kernel engine through the network component. It is to be known that during an initialization process of the blockchain system, the kernel engine may start an instance of the network component that periodically monitors the presence of the to-be-processed blockchain data during the operation process of the blockchain system. Of course, other components in the blockchain system, such as a consensus component, a contract component and a permission component, are also started simultaneously. Specifically, during the initialization process of the blockchain system, resources required by the components are pre-allocated to each component to be used when the component is called, thereby reducing the response delay of the blockchain system.

The to-be-processed blockchain data refers to data needing to be processed by a blockchain node. Exemplarily, the to-be-processed blockchain data may further include governance data, that is, operation data for managing a network, specifically, operation data for changing a block generation node, managing a node and monitoring a network state. The to-be-processed blockchain data may also be a query request by a user for data in the blockchain received by the kernel engine. The specific content of the to-be-processed blockchain data is not limited here, and is determined specifically according to actual situations.

In step S120, the to-be-processed blockchain data is processed through the kernel engine, a kernel component call request is generated based on a kernel component interface during the processing process, and a kernel component corresponding to the kernel component call request is called according to the kernel component call request, where at least one kernel component is provided.

At least one kernel component is provided, and the specific number and types of the kernel components are not limited here and are specifically determined according to scenarios the blockchain system applicable to and the functions required to be provided thereof. However, it is to be noted that the kernel component includes at least a blockchain-special component such as a contract component, a ledger component or a consensus component.

After acquiring the to-be-processed blockchain data, the kernel engine processes the to-be-processed blockchain data. Specifically, the kernel engine determines the kernel component interface for processing the to-be-processed blockchain data according to the to-be-processed blockchain data during the processing process, and generates the call request corresponding to the kernel component after determining the kernel component interface.

The kernel component call request refers to a request generated by the kernel engine for calling the kernel component to process the to-be-processed blockchain data. It is to be noted that the types and number of parameters included in the kernel component call request are determined according to a preset kernel component programming specification, and are not limited here and are specifically determined according to actual situations. Exemplarily, the kernel component call request includes a kernel component name, an input parameter, a requirement return parameter, a callback function and the like.

The kernel component interface provides a standard kernel component function interface for facilitating the kernel engine to call the kernel component when implementing the kernel component according to the kernel component programming specification.

The kernel engine calls the corresponding kernel component according to the kernel component call request, and satisfies a processing requirement for the to-be-processed blockchain data through the kernel component.

In step S130, the kernel component call request is executed through the kernel component to execute processing of a set component function and satisfy the processing requirement for the to-be-processed blockchain data.

After receiving the kernel component call request, the kernel component executes the processing of the set component function according to various parameters in the kernel component call request, such as the input parameter, the callback function and the requirement return parameter, so as to satisfy the processing requirement for the to-be-processed blockchain data. The set component function is related to the processing requirement for the to-be-processed blockchain data.

According to the technical solution of the embodiment of the present disclosure, the kernel engine cooperates with the kernel component based on the kernel component interface, so that the processing requirement for the to-be-processed blockchain data is satisfied. In the embodiment of the present disclosure, both the kernel engine and the kernel component use a modular design, and the two cooperate to work through the kernel component interface so as to achieve loose coupling between modules, so that both the kernel engine and the kernel component may be freely extended, and the scene applicability of the blockchain system is further extended. The method for operating the blockchain system provided by the embodiment of the present disclosure reduces the difficulty of developing the blockchain system to the extent that users only need to extend the function of the kernel component or the kernel engine according to scene requirements, thus greatly reducing the development cost of the blockchain technology.

Figure 2:
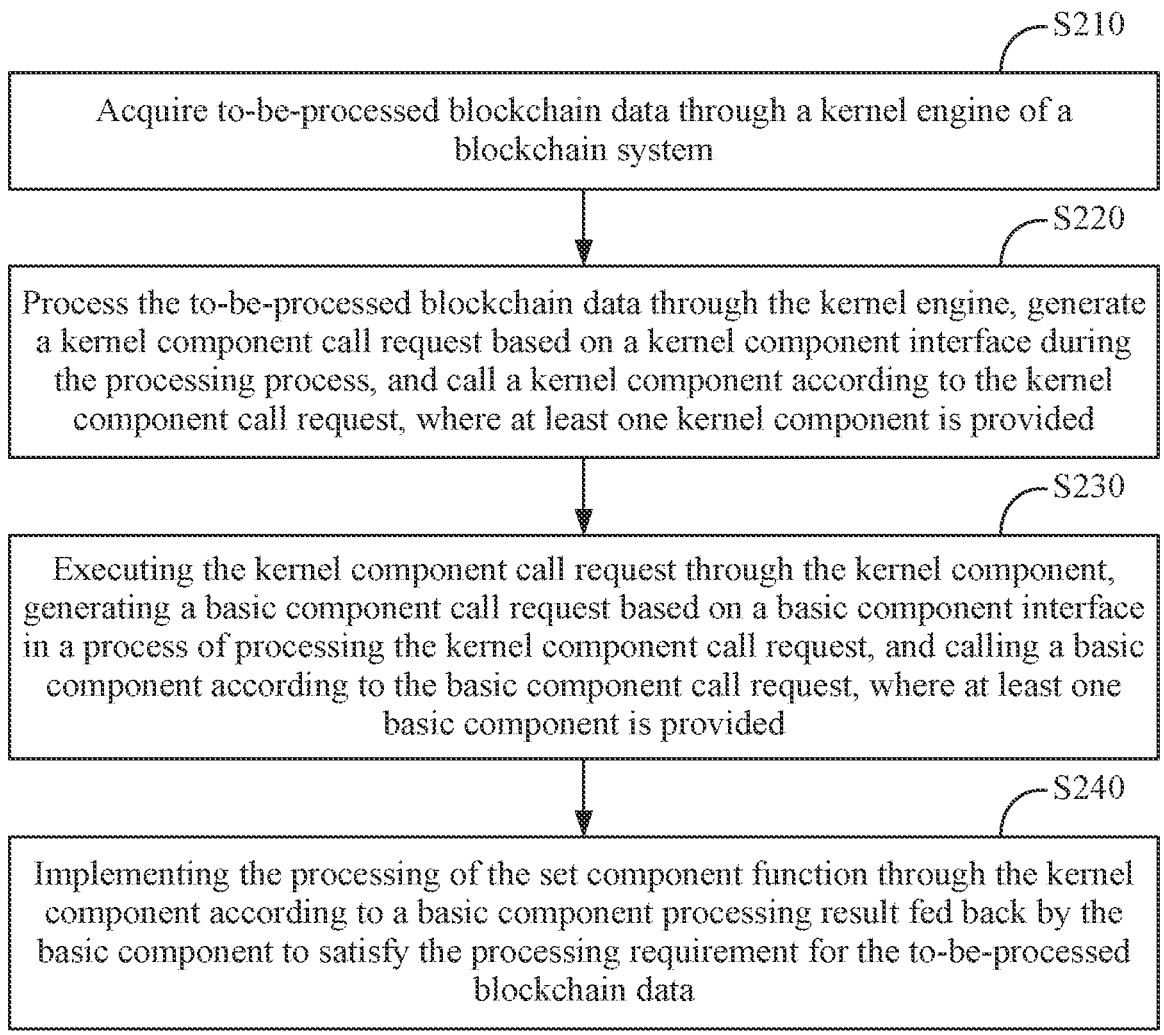
FIG. 2 is a diagram showing another method for blockchain system operation according to an embodiment of the present disclosure.

FIG. 2 is a diagram showing another method for blockchain system operation according to an embodiment of the present disclosure. This embodiment is an optional solution provided based on the preceding embodiment. Specifically, the step is refined in which the kernel component call request is executed through the corresponding kernel component to execute the processing of the set component function.

Referring to FIG. 2, the method for operating the blockchain system provided by the embodiment includes steps described below.

In step S210, to-be-processed blockchain data is acquired through a kernel engine of a blockchain system.

In step S220, the to-be-processed blockchain data is processed through the kernel engine, a kernel component call request is generated based on a kernel component interface during the processing process, and a corresponding kernel component is called according to the kernel component call request, where at least one kernel component is provided.

In an optional embodiment, the kernel component includes at least one of a contract component, a network component, a consensus component, a ledger component, a permission component or a cryptography component.

The contract component is configured to operate a smart contract virtual machine according to a contract call request to execute a function of a smart contract, and feed back a contract execution result to the kernel engine, where the contract call request is the kernel component call request.

Specifically, in the case where the kernel component call request is the contract call request, the contract component operates a smart contract virtual machine instance according to various parameters in the contract call request to execute the function of the smart contract, and then feeds back the contract execution result to the kernel engine. Exemplarily, in a blockchain-based quiz-with-award scene, the contract component needs to be called to determine the block winning an award.

The network component is configured to perform network interaction with another node in a blockchain network according to a network interaction request, and feed back data received from the blockchain network to the kernel engine, where the network interaction request is the kernel component call request. The network component plays an important role in the operation process of the blockchain system and is responsible for the communication between various block nodes within the blockchain.

Specifically, in the case where the kernel component call request is the network interaction request, the network component performs network interaction with other nodes in the blockchain network according to various parameters in the network interaction request. The network interaction includes a data reception process and a data sending process between nodes in the blockchain network. The network component feeds back the data received from the blockchain network to the kernel engine.

The consensus component is configured to execute a set consensus policy with another node in a blockchain network according to a consensus execution request, determine a consensus execution result, and feed back the consensus execution result to the kernel engine, where the consensus execution request is the kernel component call request.

Specifically, in the case where the kernel component call request is the consensus execution request, the consensus component executes the set consensus policy with other nodes in the blockchain network according to the consensus execution request, determines the consensus execution result, and then feeds back the consensus execution result to the kernel engine. Exemplarily, in the scene of determining the block generation node in the blockchain, the consensus component needs to be called to determine the block generation node of this round.

The ledger component is configured to perform access processing on ledger data in a ledger access request based on a blockchain ledger rule, and feed back a ledger access result to the kernel engine, where the ledger access request is the kernel component call request.

Specifically, in the case where the kernel component call request is the ledger access request, the ledger component performs access processing on the ledger data in the ledger access request based on the blockchain ledger rule according to various parameters in the ledger access request, and feeds back the ledger access result to the kernel engine. Exemplarily, in the blockchain-based quiz-with-award scene similarly, the ledger component needs to be called to determine the ledger data in the account of the award-issuing node, that is, another relevant node. The ledger component may further be configured to identify blockchain forks, and specifically, the kernel engine performs blockchain fork identification when calling the ledger component to perform ledger data writing. The ledger data structure adopted by the ledger component is optionally the same as the ledger data structure adopted by the kernel engine, and the same data structure may be used to directly initiate operations on the ledger data to the kernel engine.

The permission component is configured to control call permission of a smart contract based on a permission control request, where the permission control request is the kernel component call request.

Specifically, to ensure data security, not all the blockchain nodes can call the smart contract. In the case of determining and updating the call permission of the smart contract, the permission component needs to be called to control the call permission of the smart contract according to various parameters in the permission control request.

The cryptography component is configured to perform encryption-and-decryption processing based on an encryption-and-decryption signature request, where the encryption-and-decryption signature request is the kernel component call request.

The blockchain refers to a technical scheme of maintaining a reliable database collectively in a decentralized and trustless manner. In the blockchain system, the process of a block node encrypting a generated data block and verifying the validity of a data block transmitted by other block nodes is frequently involved. Specifically, in the verification process, the cryptography component needs to be called and performs the encryption-and-decryption processing on the data block according to the encryption-and-decryption signature request.

In step S230, the kernel component call request is executed through the corresponding kernel component, a basic component call request is generated based on a basic component interface in a process of processing the kernel component call request, and a basic component corresponding to the basic component call request is called according to the basic component call request, where at least one basic component is provided.

The basic component refers to a basic function component completely independent of the specific business scene and configured to support the operation of the blockchain system. In an optional embodiment, the basic component includes at least one of: a basic storage component, a peer-to-peer network component, a cryptography library component, a codec component or a log library component.

The basic storage component, the peer-to-peer network component, the cryptography library component, the codec component and the log library component are respectively configured to support a data storage function, a network interaction and data transmission function, a signature encryption-and-decryption function, a data codec function and a blockchain system operation condition recording function during the operation process of the blockchain system.

The kernel component determines the basic component interface according to various parameters in the kernel component call request, and generates the basic component call request. The kernel component calls the basic component based on the basic component interface according to the basic component call request, and executes the basic component call request through the basic component.

The basic component interface provides a standard basic component function interface for facilitating the kernel engine to call the basic component when implementing the basic component according to a basic component programming specification. Similar to the case of the kernel component call request, the types and number of parameters included in the basic component call request are determined according to a preset basic component programming specification, and are not limited here and are specifically determined according to actual situations. Exemplarily, the basic component call request includes: a basic component name, an input parameter, a requirement return parameter, a callback function and other parameters.

Optionally, the kernel component generates at least one basic component call request during the process of executing the kernel component call request.

In step S240, the processing of the set component function is implemented through the corresponding kernel component according to a basic component processing result fed back by the basic component to satisfy the processing requirement for the to-be-processed blockchain data.

After executing the basic component call request, the basic component feeds back the basic component processing result to the kernel component, so as to implement the processing of the set component function and satisfy the processing requirement for the to-be-processed blockchain data.

According to the technical solution of the embodiment of the present disclosure, the kernel component executes the kernel component call request, the basic component call request is generated based on the basic component interface during the process of processing the kernel component call request, and the basic component is called according to the basic component call request. In the embodiment of the present disclosure, the kernel engine, the kernel component and the basic component all use a modular design, and the three cooperate to work through the basic component interface so as to achieve loose coupling between modules, so that the kernel engine, the kernel component and the basic component can all be freely extended, and the scene applicability of the blockchain system is further extended. According to the embodiment of the present disclosure, the function implementation logic is separated from the kernel component and the kernel engine, so that the extensibility of the blockchain system is improved, and the development cost of the blockchain technology is greatly reduced.

Figure 3:
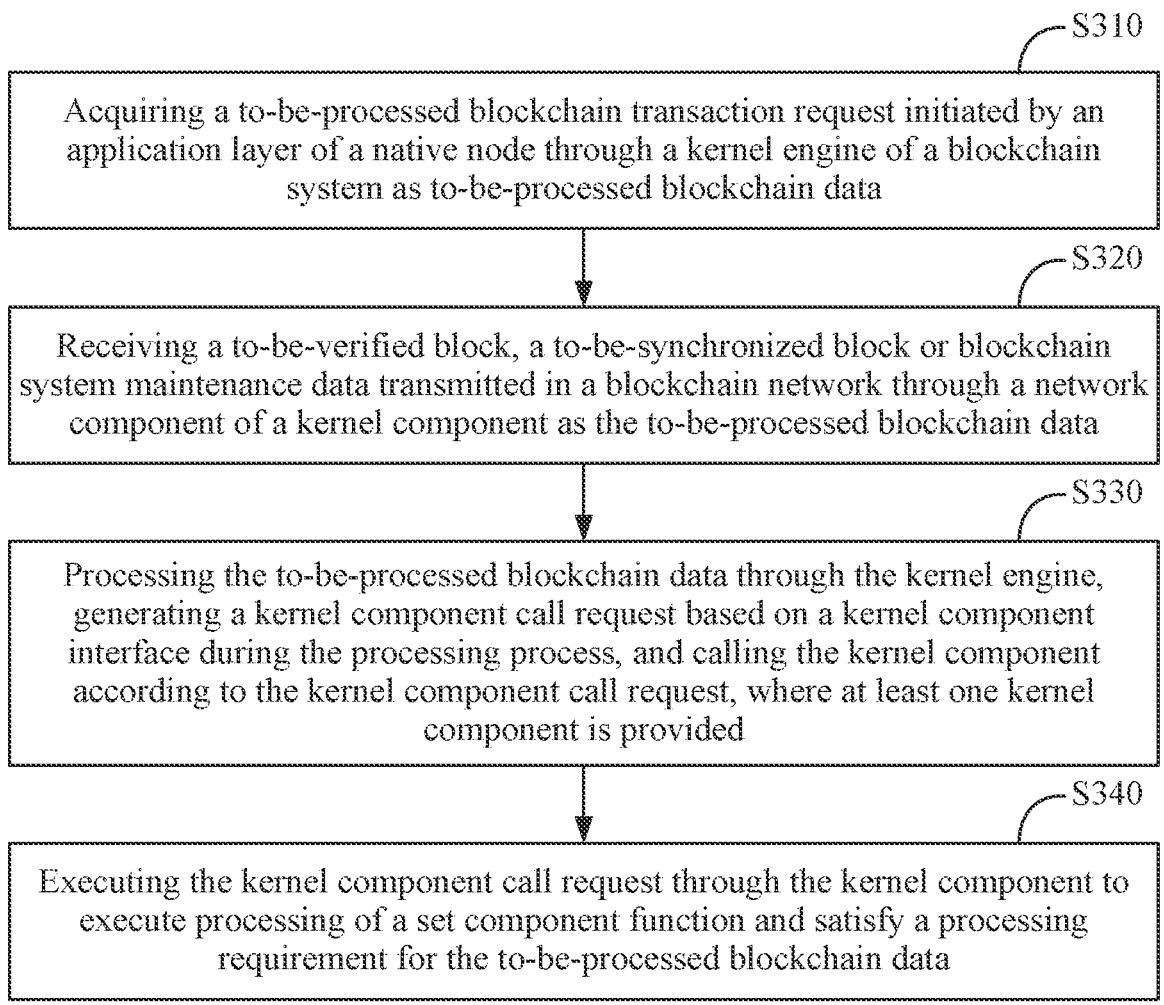
FIG. 3 is a diagram showing another method for blockchain system operation according to an embodiment of the present disclosure.

FIG. 3 is a diagram showing another method for blockchain system operation according to an embodiment of the present disclosure. This embodiment is an optional solution provided based on the preceding embodiments. Specifically, the step is refined in which the to-be-processed blockchain data is acquired through the kernel engine of the blockchain system.

Referring to FIG. 3, the method for operating the blockchain system provided by the embodiment includes steps described below.

In step S310, a to-be-processed blockchain transaction request initiated by an application layer of a native node is acquired through a kernel engine of a blockchain system as to-be-processed blockchain data.

The application layer of the native node may directly embody a business scene, and a client may initiate the to-be-processed transaction request to the blockchain system through the application layer. Specifically, the application layer sends the to-be-processed transaction request to the kernel engine in the blockchain system. The to-be-processed transaction request refers to a transaction request for operating on data on the blockchain. In the embodiment of the present disclosure, the transaction request may be any transaction request supported in the blockchain system and may be a business transaction request, a management transaction request and the like which is related to the specific business.

To enable the bottom layer of the blockchain in the blockchain system to communicate with a device outside the blockchain, in an optional embodiment, the step in which the to-be-processed blockchain transaction request initiated by the application layer of the native node is acquired through the kernel engine of the blockchain system as the to-be-processed blockchain data includes steps described below. A network interaction port of a client of the application layer is monitored through an access service unit of the blockchain system. In the case where a submission instruction of the to-be-processed blockchain transaction request is monitored through the access service unit, a request processing instruction is generated, and the request processing instruction is transmitted to a request submission interface of the kernel engine. The request processing instruction is received through the kernel engine, and the to-be-processed blockchain transaction request is acquired according to the request processing instruction.

The access service unit is configured in the blockchain system for monitoring whether the network interaction port of the client of the application layer receives the submission instruction of the to-be-processed blockchain transaction request.

The network interaction port refers to a port for receiving the submission instruction of the to-be-processed blockchain transaction request generated by the client of the application layer. The submission instruction of the to-be-processed blockchain transaction request is an instruction generated by the client of the application layer and is used for submitting the to-be-processed blockchain transaction request to the kernel engine in the blockchain system.

Specifically, the access service unit is started at the same time as the blockchain system is initialized and continuously monitors the network interaction port of the client of the application layer, so as to avoid data loss and thus ensure the reliability of the blockchain system. The client of the application layer sends the submission instruction of the to-be-processed blockchain transaction request to the network interaction port through a network. After the submission instruction is monitored by the access service unit, the access service unit generates the request processing instruction and transmits the request processing instruction to the request submission interface of the kernel engine. The kernel engine receives the request processing instruction through the request submission interface, acquires the to-be-processed blockchain transaction request from the client of the application layer according to the request processing instruction, and is triggered to process the to-be-processed blockchain transaction request. After the processing is completed, the processing result of the to-be-processed blockchain transaction request is fed back through the kernel engine through the network to the client of the application layer.

In step S320, a to-be-verified block, a to-be-synchronized block or blockchain system maintenance data transmitted in a blockchain network is received through a network component of a kernel component as the to-be-processed blockchain data.

The to-be-verified block, the to-be-synchronized block or the blockchain system maintenance data are all the data generated by block nodes within the blockchain during the operation process of the blockchain system.

In an optional embodiment, the to-be-processed blockchain data includes at least one of: the to-be-processed blockchain transaction request, the to-be-verified block, the to-be-synchronized block or the blockchain system maintenance data.

The to-be-verified block refers to a block needing to be verified by the native node. Exemplarily, in the case where it is determined that other nodes are block generation nodes, to ensure data security and validity, the native node needs to verify the block generation nodes, and specifically, the native node needs to verify the block height of the block nodes, so as to ensure that the current block generation nodes are consistent with the block generation nodes determined by the native node according to a consensus mechanism.

The to-be-synchronized block refers to a block needing to synchronize transaction data in other block nodes in the blockchain.

The blockchain system maintenance data refers to the operation data used for maintaining the blockchain system, such as the operation data for changing a block generation node, managing a node and monitoring a network state.

It is to be noted that step S310 and step S320 are two parallel manners for acquiring the to-be-processed blockchain data, and no sequential logical relationship exists between the two steps, although the two steps are shown in a sequential form in FIG. 3 for the convenience of expression. During the operation process of the blockchain system, the to-be-processed blockchain data may be the to-be-processed blockchain transaction request initiated from the application layer of the native node, or may be the to-be-verified block, the to-be-synchronized block or the blockchain system maintenance data received through the network component of the kernel component. That is to say, the to-be-processed blockchain data may originate from outside the blockchain system or from nodes inside the blockchain, such as the native block node.

In step S330, the to-be-processed blockchain data is processed through the kernel engine, a kernel component call request is generated based on a kernel component interface during the processing process, and the corresponding kernel component is called according to the kernel component call request, where at least one kernel component is provided.

In step S340, the kernel component call request is executed through the corresponding kernel component to execute processing of a set component function and satisfy a processing requirement for the to-be-processed blockchain data.

According to the technical solution of the embodiment of the present disclosure, the to-be-processed blockchain transaction request initiated by the application layer of the native node is acquired through the kernel engine of the blockchain system as the to-be-processed blockchain data; or, the to-be-verified block, the to-be-synchronized block or the blockchain system maintenance data transmitted in the blockchain network is received through the network component of the kernel component as the to-be-processed blockchain data. In the embodiment of the present disclosure, the blockchain adopts a hierarchical and modular design, and thus the to-be-processed blockchain data is received by the application layer or the network component and then transmitted to the kernel engine. In this way, the to-be-processed blockchain data acquisition function is further separated from the kernel engine, and the extensibility of the blockchain system is improved.

Figure 4:
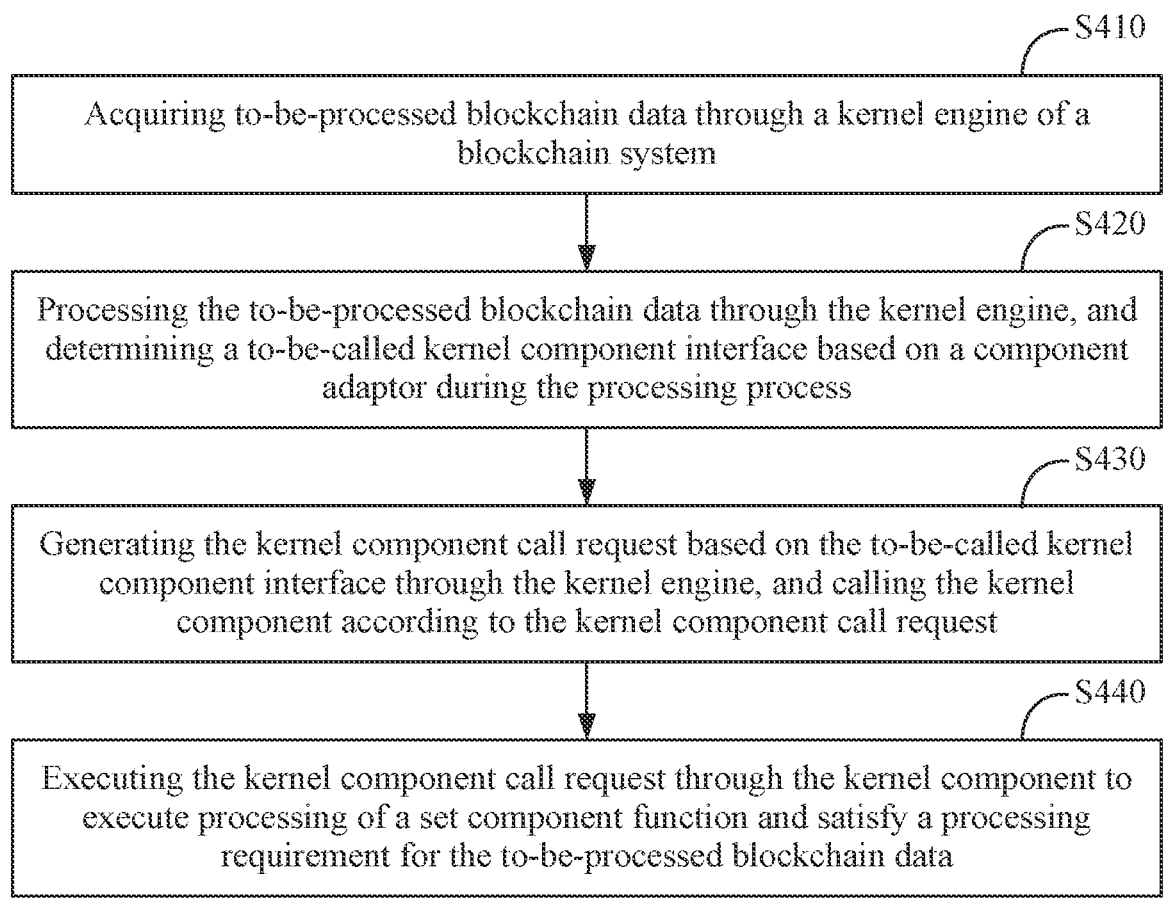
FIG. 4 is a diagram showing another method for blockchain system operation according to an embodiment of the present disclosure.

FIG. 4 is a diagram showing another method for blockchain system operation according to an embodiment of the present disclosure. This embodiment is an optional solution provided based on the preceding embodiments. Specifically, the step is refined in which the kernel component call request is generated based on the kernel component interface through the kernel engine during the processing process, and the corresponding kernel component is called according to the kernel component call request.

Referring to FIG. 4, the method for operating the blockchain system provided by the embodiment includes steps described below.

In step S410, to-be-processed blockchain data is acquired through a kernel engine of a blockchain system.

In step S420, the to-be-processed blockchain data is processed through the kernel engine, and a to-be-called kernel component interface is determined based on a component adaptor during the processing process of the to-be-processed blockchain data.

The kernel engine defines core flows of the blockchain kernel. After acquiring the to-be-processed blockchain data, the kernel engine processes the to-be-processed blockchain data. Specifically, during the processing process, the kernel engine may determine the kernel component interface for processing the to-be-processed blockchain data from kernel component interfaces provided by the kernel component adaptor, and generate a call request of the corresponding kernel component after determining the kernel component interface.

The kernel component adaptor is configured in the kernel engine layer. Optionally, a corresponding relationship between to-be-processed data and kernel component interfaces is configured in the kernel component adaptor, and data formats of different types of to-be-processed blockchain data are different. The adaptor may perform appropriate conversion according to the kernel component interface called by the kernel engine, and an instruction-level call request capable of directly calling the kernel component is obtained through the conversion of the kernel component interface. In the embodiment of the present disclosure, the specific codes of kernel components for implementing the functions of the same type of components may be different, and the kernel instruction interfaces provided may also be different. However, the kernel component interface abstracted by the component adaptor and provided for the kernel engine is a normalized interface. Therefore, when different kernel components are selected, the kernel engine does not need to be adjusted, but the conversion of the interface is performed by the component adaptor. For example, the component adaptor may perform mapping conversion of interface names, may perform name and type conversion of interface input parameters, may check the validity of input parameters, may determine which kernel component to call according to type selection configuration of a user, etc.

In step S430, the kernel component call request is generated based on the to-be-called kernel component interface through the kernel engine, and the corresponding kernel component is called according to the kernel component call request.

In an optional embodiment, the kernel component call request includes at least one of: a deal check request, a deal execution request, a deal packaging request, a block signature request, a block update request, a block broadcast request, a miner query request, a contract call request, a signature check request or a block check request.

It is to be known that different kernel component call requests may correspond to the same kernel component.

The deal check request refers to a request for a ledger component for being called to check deal data. The transaction request processed in the blockchain may also be referred to as a deal request, however, it is to be understood by those skilled in the art that transactions that may be processed by the blockchain are not limited to deals and may be other business requirements.

The deal execution request refers to a request for calling a contract component to execute a deal by operating a smart contract virtual machine instance.

The block signature request refers to a request for calling a cryptography component to implement block signature.

The block update request refers to a request for calling a consensus component to update a block.

The block broadcast request refers to a request for calling a network component to perform block broadcast.

The miner query request refers to a request for calling a consensus component to query the record of a current miner or a previous miner. The miner refers to a blockchain node that has a block generation qualification in a current block generation period. The block generation qualification may be determined based on the consensus mechanism. The miner referred to in the embodiment of the present disclosure is not limited to the block generation node determined by the POW consensus mechanism.

The contract call request refers to a request for calling a contract component to operate a smart contract.

The signature check request refers to a request for calling a cryptography component to check a signature.

The block check request refers to a request for calling a consensus component to check a block.

In step S440, the kernel component call request is executed through the kernel component to execute processing of a set component function and satisfy a processing requirement for the to-be-processed blockchain data.

According to the technical solution of the embodiment of the present disclosure, the to-be-processed blockchain data is processed through the kernel engine, the to-be-called kernel component interface is determined based on the component adaptor during the processing process, the kernel component call request is generated based on the kernel component interface through the kernel engine, and the corresponding kernel component is called according to the kernel component call request. In the embodiment of the present disclosure, the component adaptor is provided, so that loose coupling between the kernel component and the kernel engine is achieved through the component adaptor and according to the kernel component interface corresponding to the to-be-processed blockchain data, and the extensibility and scene applicability of the blockchain system are improved.

Figure 5:
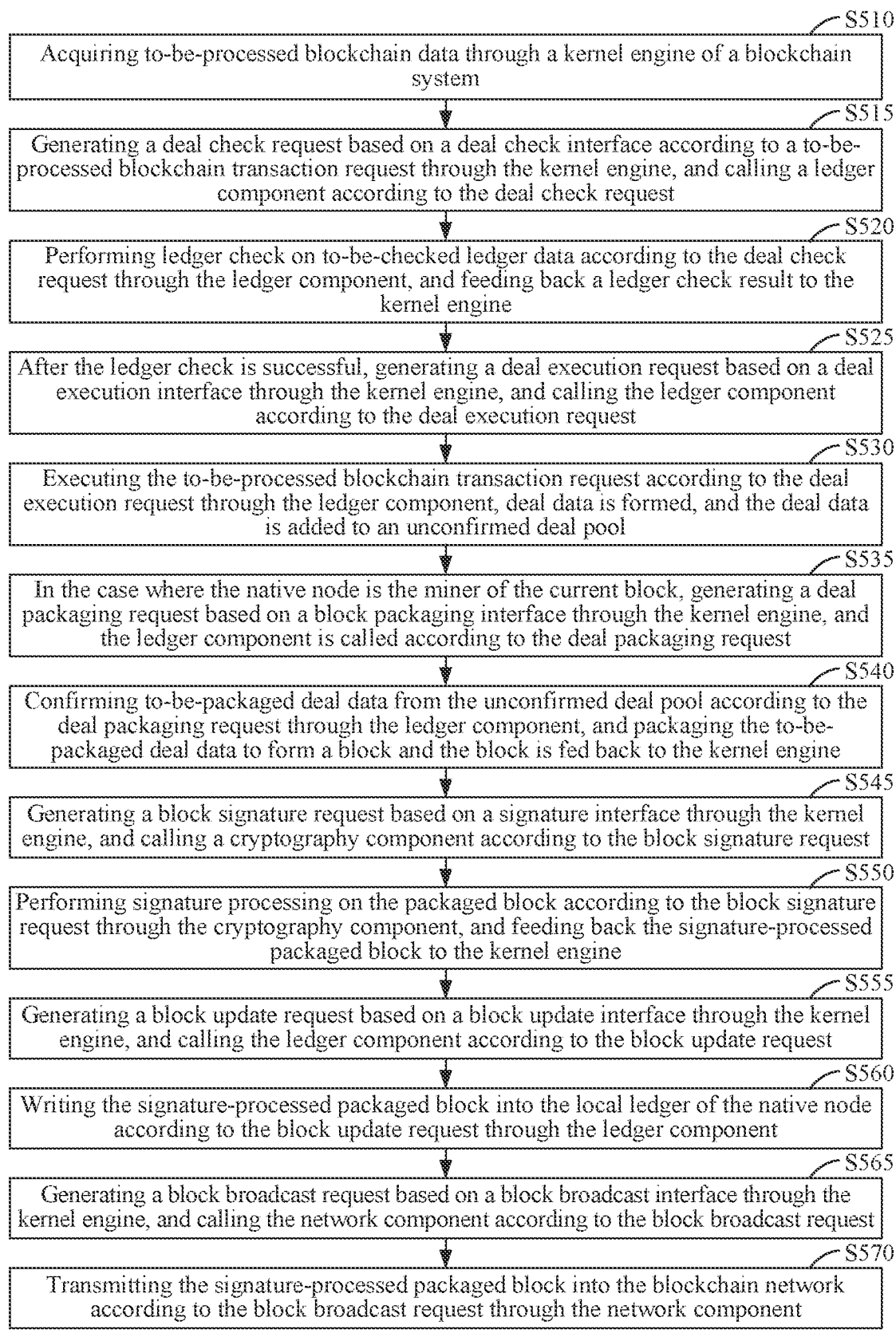
FIG. 5 is a diagram showing another method for blockchain system operation according to an embodiment of the present disclosure.

FIG. 5 is a diagram showing another method for blockchain system operation according to an embodiment of the present disclosure. This embodiment is an optional solution provided based on the preceding embodiments. The embodiment of the present disclosure describes the operation flow of the blockchain system in the case of performing deal submission. Specifically, in the case of deal submission, the step is refined in which the kernel component call request is generated based on the kernel component interface through the kernel engine during the processing process, the corresponding kernel component is called according to the kernel component call request, and the kernel component call request is executed through the corresponding kernel component to execute the processing of the set component function.

Referring to FIG. 5, the method for operating the blockchain system provided by the embodiment includes steps described below.

In step S510, to-be-processed blockchain data is acquired through a kernel engine of a blockchain system.

Optionally, the to-be-processed blockchain data may be a deal submission request sent by a client of the application layer to the kernel engine through the network. The to-be-processed blockchain data includes a to-be-submitted deal identification and deal data. The deal data includes information such as deal participants and a deal amount of money. The to-be-submitted deal identification may be used for distinguishing different to-be-submitted deals and is a unique identification of a to-be-submitted deal, so that the to-be-submitted deal may be traced.

In step S515, a deal check request is generated based on a deal check interface according to a to-be-processed blockchain transaction request through the kernel engine, and a ledger component is called according to the deal check request.

The kernel engine receives the to-be-processed blockchain data, processes the to-be-processed blockchain data, and verifies the to-be-submitted deal first. Specifically, the kernel engine determines the deal check interface according to the to-be-processed blockchain data, generates the deal check request based on the deal check interface, calls the ledger component according to the deal check request, and checks the deal request through the ledger component.

In step S520, ledger check is performed on to-be-checked ledger data according to the deal check request through the ledger component, and a ledger check result is fed back to the kernel engine.

After receiving the deal check request, the ledger component calls a basic component according to various parameters in the deal check request, performs the ledger check on the to-be-checked ledger data, and feeds back the ledger check result to the kernel engine. Exemplarily, in the case where the account of node A remits a set amount of money to the account of node B, the ledger component performs the ledger check on the to-be-checked ledger data, and steps described below may be included. Whether node A and node B are owners of the deal accounts in the deal request is checked, the amount of money in the account of node A is checked to ensure that the funds in the account of node A are sufficient, or the ledger data is checked according to a common ledger of the blockchain to determine whether double-spending exists in the deal.

In step S525, after the ledger check is successful, a deal execution request is generated based on a deal execution interface through the kernel engine, and the ledger component is called according to the deal execution request.

If the ledger check result fed back to the kernel engine by the ledger component is the success, it may be determined that the deal may continue to be executed, otherwise the deal is terminated.

After receiving the check result that the ledger check is successful, the kernel engine generates the deal execution request through the deal execution interface provided by the ledger component, and calls the ledger component to execute the deal according to the deal execution request. The deal execution request may include information such as deal participation nodes and a deal amount of money.

In step S530, the to-be-processed blockchain transaction request is executed according to the deal execution request through the ledger component, deal data is formed, and the deal data is added to an unconfirmed deal pool;

The deal data refers to data generated during the process of the ledger component executing the deal corresponding to the deal execution request.

Exemplarily, the process of transferring a set amount of money from the account of node A to the account of node B is completed through the ledger book component, and changes in the amount of money, flow of money, deal time and the like of the account of node A and the account of node B are configured as the deal data.

Unconfirmed deal data formed by the ledger component is put in the unconfirmed deal pool to be confirmed by other block nodes.

In an optional embodiment, the step in which the kernel component call request is generated based on the kernel component interface through the kernel engine during the processing process, the corresponding kernel component is called according to the kernel component call request, and the kernel component call request is executed through the corresponding kernel component to execute the processing of the set component function includes steps described below. A miner query request is continuously generated according to a set rule based on a miner query interface through the kernel engine, and a consensus component is called according to the miner query request. Whether a native node is a miner of a current block is queried according to the miner query request through the consensus component, and a miner query result is fed back to the kernel engine.

The set rule, in the blockchain system pre-configured by a relevant technical person, is used for specifying the opportunity for calling the consensus component to query the miner, and is specifically determined according to actual requirements and is not limited here. Exemplarily, the set rule may be to generate the miner query request in response to a to-be-verified block transmitted in a blockchain network is monitored by a network component, or, may be to periodically query a current miner at set time intervals. The kernel engine calls the consensus component according to the miner query request, and the consensus component queries the block generation miner and feeds back the miner query result to the kernel engine.

Since whether the native node is the miner affects the processing flow of the to-be-processed blockchain data of the native node, the kernel engine needs to determine whether the native node is the miner of the current block through the consensus component.

If the native node is the current miner, the native node is the block generation node at this moment, and a block packaging flow is directly entered after a block is generated. Specifically, the kernel engine calls a corresponding kernel component, and the native node completes packaging processing on the generated block. If the native node is not the current miner, when receiving the to-be-verified block of other blocks transmitted by the network component, the kernel engine needs to verify the to-be-verified block.

In step S535, in the case where the native node is the miner of the current block, a deal packaging request is generated based on a block packaging interface through the kernel engine, and the ledger component is called according to the deal packaging request.

If the native node is the miner of the current block, the native node is the block generation node at this moment, a flow of generating a new block is started, and the deal data is packaged into a new block and issued to the blockchain network. The new block is checked by other nodes in the blockchain network. Specifically, the kernel engine determines the block packaging interface, generates the deal packaging request based on the block packaging interface, and calls the ledger component according to the deal packaging request. The ledger component performs packaging processing on the to-be-packaged deal.

In step S540, to-be-packaged deal data is confirmed from the unconfirmed deal pool according to the deal packaging request through the ledger component, and the to-be-packaged deal data is packaged to form a block and the block is fed back to the kernel engine.

The deal packaging request includes a to-be-packaged deal identification, and the ledger component confirms the to-be-packaged deal data in the unconfirmed deal pool according to the to-be-packaged deal identification, packages the to-be-packaged deal data to form a block, and feeds back the generated block to the kernel engine.

In step S545, a block signature request is generated based on a signature interface through the kernel engine, and a cryptography component is called according to the block signature request.

After the deal data is packaged into the block, the native node needs to perform signature on the generated block to indicate that the native node confirms and is responsible for that the deal data is accurate and correct. Specifically, after receiving the generated block, the kernel engine generates the block signature request based on the signature interface, calls the cryptography component according to the block signature request, and completes the signature processing on the new block through the cryptography component.

In step S550, signature processing is performed on the packaged block according to the block signature request through the cryptography component, and the signature-processed packaged block is fed back to the kernel engine.

The cryptography component determines the to-be-signature-processed block according to a to-be-signature-processed block identification in the blockchain request, performs the signature processing on the to-be-signature-processed block, and feeds back the block with the signature of the native node to the kernel engine.

In step S555, a block update request is generated based on a block update interface through the kernel engine, and the ledger component is called according to the block update request.

After receiving the block with the signature of the native node, the kernel engine determines the block update interface, generates the block update request based on the block update interface, calls the ledger component according to various parameters in the block update request, and updates a local ledger of the native node through the ledger component.

In step S560, the signature-processed packaged block is written into the local ledger of the native node according to the block update request through the ledger component.

The ledger component writes the block with the signature of the native node into the local leger of the native node according to a to-be-updated block identification in the block update request.

In step S565, a block broadcast request is generated based on a block broadcast interface through the kernel engine, and the network component is called according to the block broadcast request.

The newly-generated block needs to be verified by other nodes in the blockchain network after being verified by the native node. After updating the local ledger of the native node, the kernel engine determines the block broadcast interface, generates the block broadcast request based on the block broadcast interface, calls the network component according to the block broadcast request, and broadcasts the generated block in the blockchain through the network component.

In step S570, the signature-processed packaged block is transmitted into the blockchain network according to the block broadcast request through the network component.

The network component transmits the block with the signature of the native node into the blockchain network according to the block broadcast request, so that other blocks in the blockchain network can acquire the new block.

According to the technical solution of the embodiment of the present disclosure, the kernel engine cooperates with the kernel component based on the kernel component interface, so that the processing requirement for the to-be-processed blockchain data is satisfied. In the present disclosure, both the kernel engine and the kernel component use a modular design, and the two cooperate to work through the kernel component interface so as to achieve loose coupling between modules, so that both the kernel engine and the kernel component may be freely extended, and the scene applicability of the blockchain system is further extended. The method for operating the blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 6:
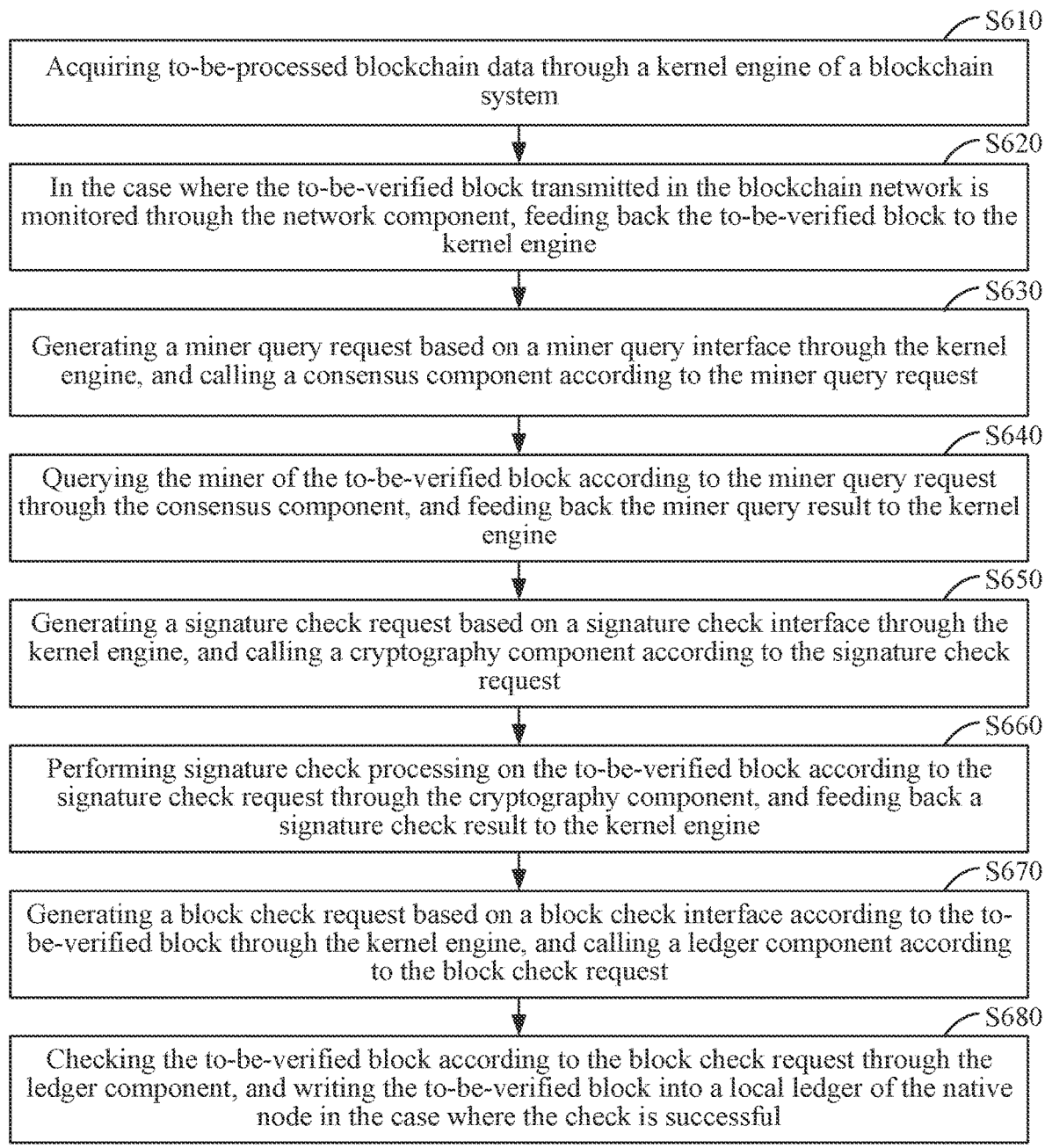
FIG. 6 is a diagram showing another method for blockchain system operation according to an embodiment of the present disclosure.

FIG. 6 is a diagram showing another method for blockchain system operation according to an embodiment of the present disclosure. The embodiment of the present disclosure describes the operation flow of the blockchain system in the case of performing block verification. Specifically, the embodiment is an optional solution provided based on the preceding embodiments for the case of block verification. Specifically, the step is refined in which the kernel component call request is generated based on the kernel component interface through the kernel engine during the processing process, the corresponding kernel component is called according to the kernel component call request, and the kernel component call request is executed through the corresponding kernel component to execute the processing of the set component function.

Referring to FIG. 6, the method for operating the blockchain system provided by the embodiment includes steps described below.

In step S610, to-be-processed blockchain data is acquired through a kernel engine of a blockchain system.

Specifically, the to-be-processed blockchain data may be a to-be-verified block transmitted in the blockchain network, received by a network component and transmitted to the kernel engine. Optionally, the to-be-verified block is a new block generated by a miner needing to be verified by a native node in the case where other block nodes in the blockchain network except the native node are miners.

In step S620, in the case where the to-be-verified block transmitted in the blockchain network is monitored through the network component, the to-be-verified block is fed back to the kernel engine.

The network component continuously monitors the to-be-processed blockchain data during the operation process of the blockchain system. If the to-be-verified block transmitted in the blockchain network is monitored by the network component, the network component feeds back the to-be-verified block to the kernel engine.

In step S630, a miner query request is generated based on a miner query interface through the kernel engine, and a consensus component is called according to the miner query request.

When receiving the to-be-verified block fed back by the network component, the kernel engine determines the miner query interface, generates the miner query request according to the miner query interface, and calls the consensus component. The consensus component determines the block generation miner of the to-be-verified block and feeds back a miner query result to the kernel engine.

In step S640, the miner of the to-be-verified block is queried according to the miner query request through the consensus component, and the miner query result is fed back to the kernel engine.

The consensus component queries the block generation miner of the to-be-verified block according to to-be-verified block identification information in the miner query request, and feeds back the miner query result to the kernel engine.

In step S650, a signature check request is generated based on a signature check interface through the kernel engine, and a cryptography component is called according to the signature check request.

The kernel engine determines the signature check interface, generates the signature check request based on the signature check interface, calls the cryptography component according to the signature check request, and verifies the signature carried by the to-be-verified block through the cryptography component. The signature check request includes the miner query result fed back to the kernel engine by the consensus component, that is, the miner of the to-be-verified block determined according to the consensus mechanism.

In step S660, signature check processing is performed on the to-be-verified block according to the signature check request through the cryptography component, and a signature check result is fed back to the kernel engine.

The cryptography component performs signature check processing on the to-be-verified block according to the signature check request so as to check whether the miner of the to-be-verified block is consistent with the miner determined by the native node according to the consensus mechanism. Specifically, according to the miner query result in the signature check request and the signature-processed block of the to-be-verified block, the signature check result of the to-be-verified block is determined, and the cryptography component feeds back the signature check result to the kernel engine.

In step S670, a block check request is generated based on a block check interface according to the to-be-verified block through the kernel engine, and a ledger component is called according to the block check request.

After the identity of the miner generating the to-be-verified block is confirmed, the block needs to be further checked. The kernel engine determines the block check interface according to the to-be-verified block, generates the block check request based on the block check interface, and calls the ledger component according to the block check request. The ledger component checks ledger data corresponding to the to-be-verified block.

In step S680, the to-be-verified block is checked according to the block check request through the ledger component, and the to-be-verified block is written into a local ledger of the native node in the case where the check is successful.

The ledger component checks the to-be-verified block according to the block check request, and writes the to-be-verified block into the local ledger of the native node in the case where the check is successful, indicating that the native node has confirmed that the to-be-verified block is valid.

According to the technical solution of the embodiment of the present disclosure, the kernel engine cooperates with the kernel component based on the kernel component interface, so that the processing requirement for the to-be-processed blockchain data is satisfied. In the present disclosure, both the kernel engine and the kernel component use a modular design, and the two cooperate to work through the kernel component interface so as to achieve loose coupling between modules, so that both the kernel engine and the kernel component may be freely extended, and the scene applicability of the blockchain system is further extended. The method for operating the blockchain system provided by the embodiment of the present disclosure reduces the difficulty of developing the blockchain system to the extent that users only need to extend the function of the kernel component or the kernel engine according to scene requirements, thus greatly reducing the development cost of the blockchain technology.

Figure 7A:
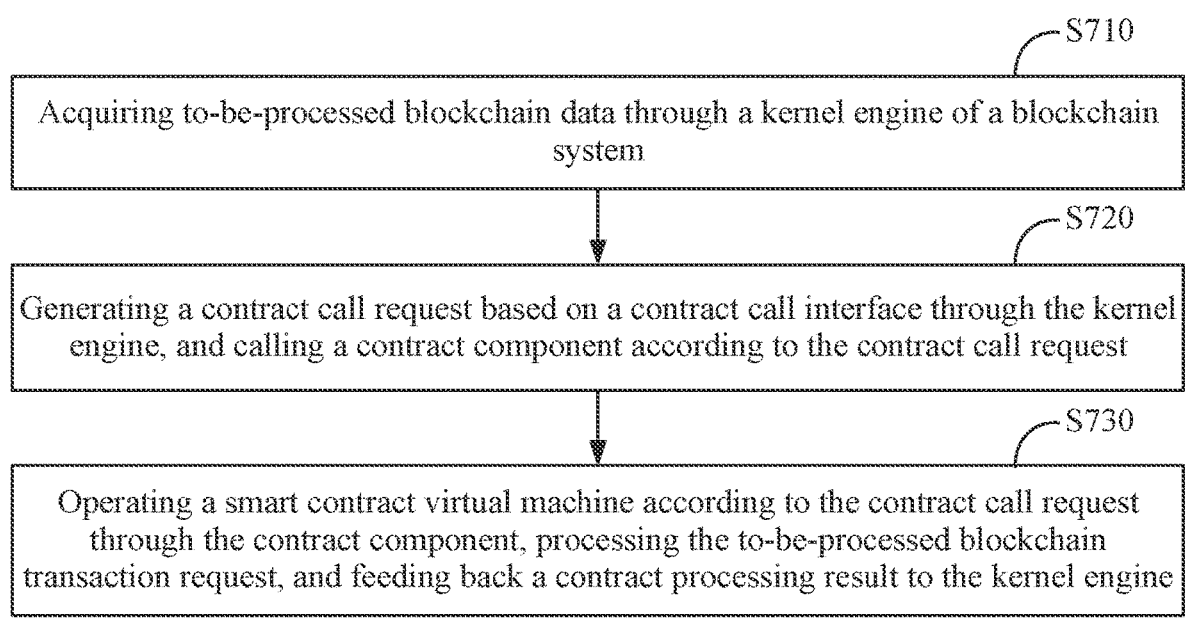
FIG. 7A is a diagram showing another method for blockchain system operation according to an embodiment of the present disclosure.

FIG. 7A is a diagram showing another method for blockchain system operation according to an embodiment of the present disclosure. This embodiment is an optional solution provided based on the preceding embodiments. Specifically, the step is refined in which the kernel component call request is generated based on the kernel component interface through the kernel engine during the processing process, the corresponding kernel component is called according to the kernel component call request, and the kernel component call request is executed through the corresponding kernel component to execute the processing of the set component function.

In step S710, to-be-processed blockchain data is acquired through a kernel engine of a blockchain system.

Optionally, the to-be-processed blockchain data may be a to-be-processed blockchain transaction request sent by a client of the application layer through the network. Exemplarily, the to-be-processed blockchain transaction request is an award-winning node determination request sent by the client of the application layer in a blockchain-based quiz-with-award scene. A smart contract specifies the method for determining the award-winning node, and the award-winning node is determined by operating the smart contract.

In step S720, a contract call request is generated based on a contract call interface through the kernel engine, and a contract component is called according to the contract call request.

The kernel engine determines the contract call interface according to the to-be-processed blockchain transaction request, generates the contract call request based on the contract call interface, and calls the contract component according to the contract call request. A smart contract virtual machine instance is operated through the contract component, so that the processing requirement for the to-be-processed blockchain data is satisfied. For example, the award-winning node participating in the quiz with award is determined by operating the smart contract virtual machine instance.

In step S730, a smart contract virtual machine is operated according to the contract call request through the contract component, the to-be-processed blockchain transaction request is processed, and a contract processing result is fed back to the kernel engine.

According to a smart contract identification in the contract call request, the contract component determines the smart contract and operates the smart contract virtual machine instance, implements the processing of the to-be-processed blockchain transaction request by operating the smart contract virtual machine instance, and feeds back the contract processing result to the kernel engine. Exemplarily, the contract processing result is the block identification of the award-winning block.

Figure 7B:
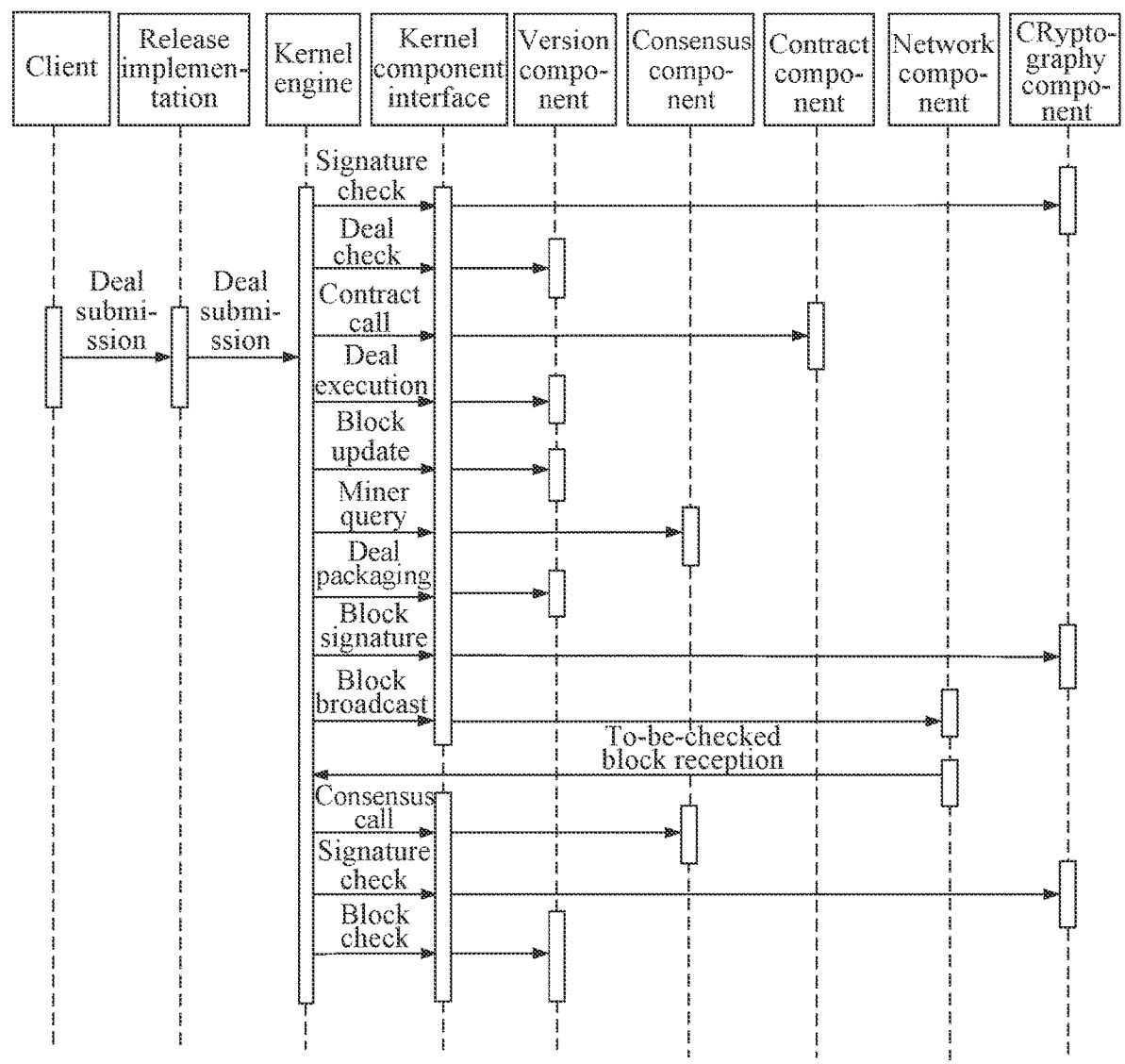
FIG. 7B is a diagram showing the case where each kernel component is called by a kernel engine during a processing process of to-be-processed blockchain data according to each of the preceding embodiments of the present disclosure.

FIG. 7B is a schematic diagram showing the case where each kernel component is called by a kernel engine during a processing process of to-be-processed blockchain data according to each of the preceding embodiments of the present disclosure. Reference may be made to the description of the preceding embodiments for the specific call of kernel components, which is not be repeated here.

According to the technical solution of the embodiment of the present disclosure, the kernel engine cooperates with the kernel component based on the kernel component interface, so that the processing requirement for the to-be-processed blockchain data is satisfied. In the present disclosure, both the kernel engine and the kernel component use a modular design, and the two cooperate to work through the kernel component interface so as to achieve loose coupling between modules, so that both the kernel engine and the kernel component may be freely extended, and the scene applicability of the blockchain system is further extended. The method for operating the blockchain system provided by the present disclosure reduces the difficulty of developing the blockchain system to the extent that users only need to extend the function of the kernel component or the kernel engine according to scene requirements, thus greatly reducing the development cost of the blockchain technology.

Figure 8:
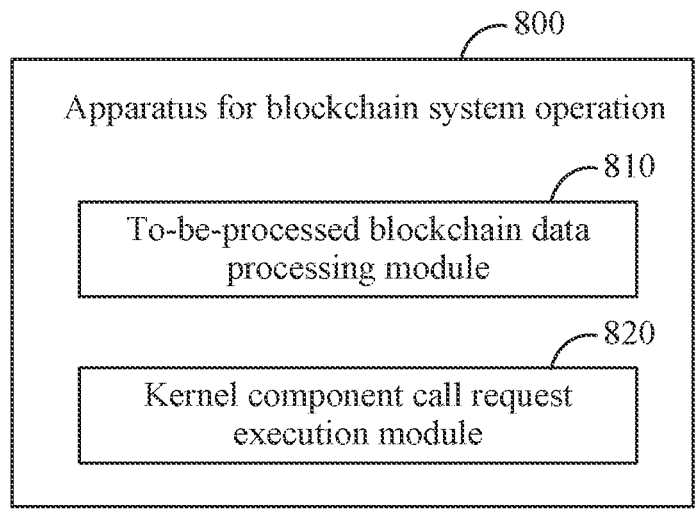
FIG. 8 is a diagram showing an apparatus for operating a blockchain system according to an embodiment of the present disclosure.

FIG. 8 is a diagram showing an apparatus for operating a blockchain system according to an embodiment of the present disclosure. Referring to FIG. 8, the embodiment of the present disclosure discloses an apparatus 800 for blockchain system operation. The apparatus 800 may include: a to-be-processed blockchain data processing module 810 and a kernel component call request execution module 820.

The to-be-processed blockchain data processing module 810 is configured to process, through a kernel engine of a blockchain system, to-be-processed blockchain data, generate a kernel component call request based on a kernel component interface during the processing process, and call a corresponding kernel component according to the kernel component call request, where at least one kernel component is provided.

The kernel component call request execution module 820 is configured to execute, through the corresponding kernel component, the kernel component call request to execute processing of a set component function and satisfy a processing requirement for the to-be-processed blockchain data.

According to the technical solution of the embodiment of the present disclosure, the kernel engine cooperates with the kernel component based on the kernel component interface, so that the processing requirement for the to-be-processed blockchain data is satisfied. In the present disclosure, both the kernel engine and the kernel component use a modular design, and the two cooperate to work through the kernel component interface so as to achieve loose coupling between modules, so that both the kernel engine and the kernel component may be freely extended, and the scene applicability of the blockchain system is further extended. The method for operating the blockchain system provided by the present disclosure reduces the difficulty of developing the blockchain system to the extent that users only need to extend the function of the kernel component or the kernel engine according to scene requirements, thus greatly reducing the development cost of the blockchain technology.

Optionally, the kernel component call request execution module 820 includes a basic component call submodule and a set component function implementation submodule. The basic component call submodule is configured to execute, through the kernel component, the kernel component call request, generate a basic component call request based on a basic component interface in a process of processing the kernel component call request, and call a basic component according to the basic component call request, where at least one basic component is provided.

The set component function implementation submodule is configured to implement, through the corresponding kernel component, the processing of the set component function according to a basic component processing result fed back by the basic component.

Optionally, the basic component includes at least one of: a basic storage component, a peer-to-peer network component, a cryptography library component, a codec component or a log library component.

Optionally, the corresponding kernel component includes at least one of a contract component, a network component, a consensus component, a ledger component, a permission component or a cryptography component.

The contract component is configured to operate a smart contract virtual machine according to a contract call request to execute a function of a smart contract, and feed back a contract execution result to the kernel engine, where the contract call request is the kernel component call request.

The network component is configured to perform network interaction with another node in a blockchain network according to a network interaction request, and feed back data received from the blockchain network to the kernel engine, where the network interaction request is the kernel component call request.

The consensus component is configured to execute a set consensus policy with another node in a blockchain network according to a consensus execution request, determine a consensus execution result, and feed back the consensus execution result to the kernel engine, where the consensus execution request is the kernel component call request.

The ledger component is configured to perform access processing on ledger data in a ledger access request based on a blockchain ledger rule, and feed back a ledger access result to the kernel engine, where the ledger access request is the kernel component call request.

The permission component is configured to control call permission of a smart contract based on a permission control request, where the permission control request is the kernel component call request.

The cryptography component is configured to perform encryption-and-decryption processing based on an encryption-and-decryption signature request, where the encryption-and-decryption signature request is the kernel component call request.

Optionally, the to-be-processed blockchain data includes at least one of: a to-be-processed blockchain transaction request, a to-be-verified block, a to-be-synchronized block or blockchain system maintenance data.

Optionally, the apparatus further includes: a first to-be-processed blockchain data acquisition submodule and a second to-be-processed blockchain data acquisition submodule. The first to-be-processed blockchain data acquisition submodule is configured to acquire, through the kernel engine of the blockchain system, a to-be-processed blockchain transaction request initiated by an application layer of a native node as the to-be-processed blockchain data.

The second to-be-processed blockchain data acquisition submodule is configured to receive, through the network component of the corresponding kernel component, a to-be-verified block, a to-be-synchronized block or blockchain system maintenance data transmitted in the blockchain network as the to-be-processed blockchain data.

Optionally, the first to-be-processed blockchain data acquisition submodule includes a network interaction port monitoring unit, a request processing instruction generation unit and a to-be-processed blockchain transaction request acquisition unit. The network interaction port monitoring unit is configured to monitor, through an access service unit of the blockchain system, a network interaction port of a client of the application layer.

The request processing instruction generation unit is configured to in a case where a submission instruction of the to-be-processed blockchain transaction request is monitored through the access service unit, generate a request processing instruction, and transmit the request processing instruction to a request submission interface of the kernel engine.

The to-be-processed blockchain transaction request acquisition unit is configured to receive, through the kernel engine, the request processing instruction, and acquire the to-be-processed blockchain transaction request according to the request processing instruction.

Optionally, the to-be-processed blockchain data processing module 810 includes a to-be-processed blockchain data processing submodule and a kernel component call submodule.

The to-be-processed blockchain data processing submodule is specifically configured to process the to-be-processed blockchain data through the kernel engine.

The kernel component call submodule is specifically configured to generate, through the kernel engine, the kernel component call request based on the kernel component interface during the processing process, and call the corresponding kernel component according to the kernel component call request.

The kernel component call submodule includes a to-be-called kernel component interface determination unit and a kernel component call unit.

The to-be-called kernel component interface determination unit is configured to determine, through the kernel engine, a to-be-called kernel component interface based on a component adaptor during the processing process.

The kernel component call unit is configured to generate, through the kernel engine, the kernel component call request based on the to-be-called kernel component interface, and call the corresponding kernel component according to the kernel component call request.

Optionally, the kernel component call request includes at least one of: a deal check request, a deal execution request, a deal packaging request, a block signature request, a block update request, a block broadcast request, a miner query request, a contract call request, a signature check request or a block check request.

Optionally, the kernel component call submodule includes a deal check request generation unit, a to-be-checked ledger data check unit, a deal execution request generation unit, a deal data formation unit, a deal packaging request generation unit, a block packaging unit, a cryptography component call unit, a block signature unit, a block update request generation unit, a block writing unit, a block broadcast request generation unit and a block transmission unit.

The deal check request generation unit is configured to generate, through the kernel engine, a deal check request based on a deal check interface according to the to-be-processed blockchain transaction request, and call the ledger component according to the deal check request.

The to-be-checked ledger data check unit is configured to perform, through the ledger component, ledger check on to-be-checked ledger data according to the deal check request, and feed back a ledger check result to the kernel engine.

The deal execution request generation unit is configured to after the ledger check is successful, generate, through the kernel engine, a deal execution request based on a deal execution interface, and call the ledger component according to the deal execution request.

The deal data formation unit is configured to execute, through the ledger component, the to-be-processed blockchain transaction request according to the deal execution request, form deal data, and add the deal data to an unconfirmed transaction pool.

The deal packaging request generation unit is configured to in a case where a native node is a miner of a current block, generate, through the kernel engine, a deal packaging request based on a block packaging interface, and call the ledger component according to the deal packaging request.

The block packaging unit is configured to confirm, through the ledger component, to-be-packaged deal data from the unconfirmed deal pool according to the deal packaging request, and package the to-be-packaged deal data to form a block and feed back the block to the kernel engine.

The cryptography component call unit is configured to generate, through the kernel engine, a block signature request based on a signature interface, and call the cryptography component according to the block signature request.

The block signature unit is configured to perform, through the cryptography component, signature processing on the packaged block according to the block signature request, and feed back the signature-processed packaged block to the kernel engine.

The block update request generation unit is configured to generate, through the kernel engine, a block update request based on a block update interface, and call the ledger component according to the block update request.

The block writing unit is configured to write, through the ledger component, the signature-processed packaged block into a local ledger of the native node according to the block update request.

The block broadcast request generation unit is configured to generate, through the kernel engine, a block broadcast request based on a block broadcast interface, and call the network component according to the block broadcast request.

The block transmission unit is configured to transmit, through the network component, the signature-processed packaged block into the blockchain network according to the block broadcast request.

Optionally, the kernel component call submodule includes a first miner query request generation unit and a miner query result feedback unit.

The first miner query request generation unit is configured to continuously generate, through the kernel engine, a miner query request according to a set rule based on a miner query interface, and call the consensus component according to the miner query request.

The miner query result feedback unit is configured to query, through the consensus component, whether a native node is a miner of a current block according to the miner query request, and feed back a miner query result to the kernel engine.

Optionally, the kernel component call submodule includes a contract call request generation unit and a smart contract virtual machine operation unit.

The contract call request generation unit is configured to generate, through the kernel engine, the contract call request based on a contract call interface, and call the contract component according to the contract call request.

The smart contract virtual machine operation unit is configured to operate, through the contract component, the smart contract virtual machine according to the contract call request, process the to-be-processed blockchain transaction request, and feed back a contract processing result to the kernel engine.

Optionally, the kernel component call submodule includes a to-be-verified block feedback unit, a second miner query request generation unit, a miner query result feedback unit, a signature check request generation unit, a to-be-verified block signature check unit, a block check request generation unit and a to-be-verified block check module.

The to-be-verified block feedback unit is configured to feed back the to-be-verified block to the kernel engine in a case where a to-be-verified block transmitted in the blockchain network is monitored through the network component.

The second miner query request generation unit is configured to generate, through the kernel engine, a miner query request based on a miner query interface, and call the consensus component according to the miner query request.

The miner query result feedback unit is configured to query, through the consensus component, a miner of the to-be-verified block according to the miner query request, and feed back a miner query result to the kernel engine.

The signature check request generation unit is configured to generate, through the kernel engine, a signature check request based on a signature check interface, and call the cryptography component according to the signature check request.

The to-be-verified block signature check unit is configured to perform, through the cryptography component, signature check processing on the to-be-verified block according to the signature check request, and feed back a signature check result to the kernel engine.

The block check request generation unit is configured to generate, through the kernel engine, a block check request based on a block check interface according to the to-be-verified block, and call the ledger component according to the block check request.

The to-be-verified block check module is configured to check, through the ledger component, the to-be-verified block according to the block check request, and write the to-be-verified block into a local ledger of a native node in a case where the check is successful.

The apparatus for operating the blockchain system provided by the embodiment of the present disclosure may execute the method for operating the blockchain system provided by any embodiment of the present disclosure, and has corresponding functional modules and beneficial effects for executing the method for operating the blockchain system.

According to the embodiments of the present disclosure, the present disclosure further provides an electronic device, a readable storage medium and a computer program product.

Figure 9:
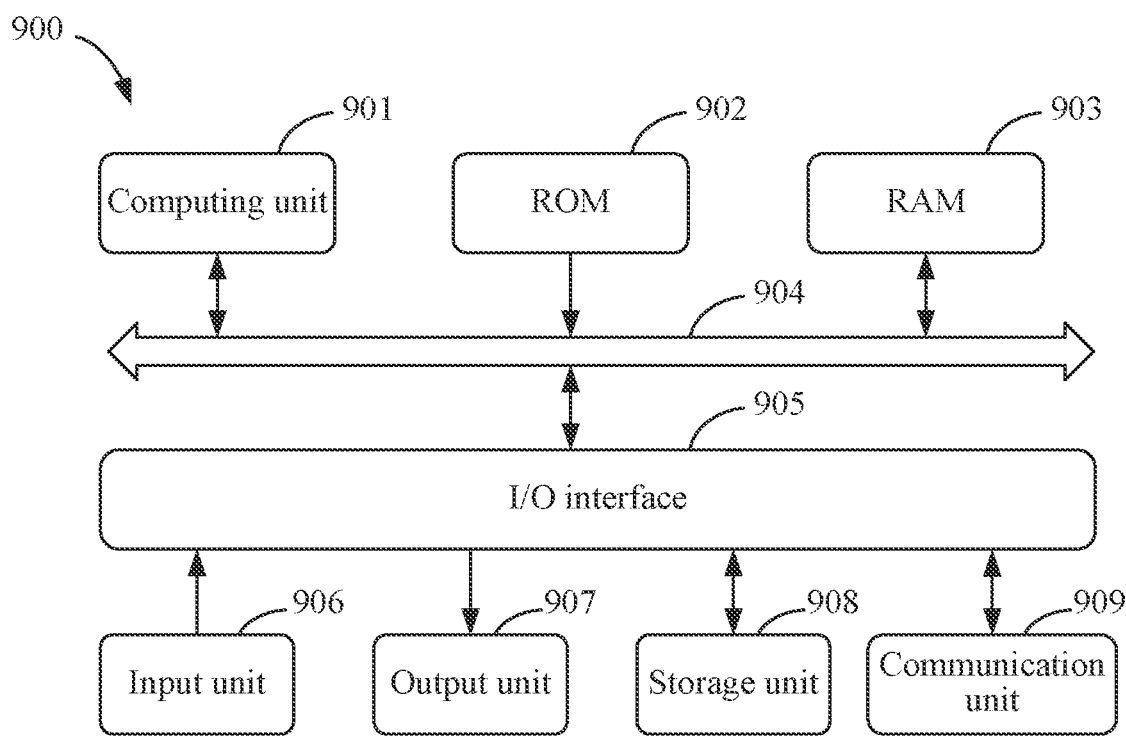
FIG. 9 is a block diagram of an electronic device for implementing A method for operating a blockchain system according to an embodiment of the present disclosure.

FIG. 9 shows a block diagram illustrative of an exemplary electronic device 900 that may be used for implementing the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 9, the device 900 includes a computing unit 901. The computing unit 901 may perform various types of appropriate operations and processing based on a computer program stored in a read-only memory (ROM) 902 or a computer program loaded from a storage unit 908 to a random-access memory (RAM) 903. Various programs and data required for operations of the device 900 may also be stored in the RAM 903 The computing unit 901, the ROM 902 and the RAM 903 are connected to each other through a bus 904. An input/output (I/O) interface 905 is also connected to the bus 904.

Multiple components in the device 900 are connected to the I/O interface 905. The components include an input unit 906 such as a keyboard and a mouse, an output unit 907 such as various types of displays and speakers, the storage unit 908 such as a magnetic disk and an optical disk, and a communication unit 909 such as a network card, a modem and a wireless communication transceiver. The communication unit 909 allows the device 900 to exchange information/data with other devices over a computer network such as the Internet and/or various telecommunications networks.

The computing unit 901 may be various general-purpose and/or special-purpose processing components having processing and computing capabilities. Examples of the computing unit 901 include, but are not limited to, a central processing unit (CPU), a graphics processing unit (GPU), a special-purpose artificial intelligence (AI) computing chip, a computing unit executing machine learning models and algorithms, a digital signal processor (DSP) and any appropriate processor, controller and microcontroller. For example, in some embodiments, the method for operating the blockchain system may be implemented as a computer software program tangibly contained in a machine-readable medium such as the storage unit 908. In some embodiments, part or all of computer programs may be loaded and/or installed on the device 900 through the ROM 902 and/or the communication unit 909. When the computer programs are loaded to the RAM 903 and executed by the computing unit 901, one or more steps of the preceding method for blockchain system operation may be executed. Alternatively, in other embodiments, the computing unit 901 may be configured, in any other suitable manner (for example, by means of firmware), to execute the method for operating the blockchain system.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting the data and instructions to the memory system, the at least one input apparatus and the at least one output apparatus.

Program codes for implementation of the method of the present disclosure may be written in any combination of one or more programming languages. The program codes may be provided for the processor or controller of a general-purpose computer, a special-purpose computer or another programmable data processing apparatus to enable functions/operations specified in flowcharts and/or block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may contain or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the clients and the servers arises by virtue of computer programs running on respective computers and having a client-server relationship to each other. The server may be a cloud server, also referred to as a cloud computing server or a cloud host. As a host product in a cloud computing service system, the server solves the defects of difficult management and weak business scalability in conventional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made according to design requirements and other factors. Any modifications, equivalent substitutions, improvements and the like made within the spirit and principle of the present disclosure are within the scope of the present disclosure.

What is claimed is:

1. A method for operating a blockchain system, comprising:
    processing, through a kernel engine of the blockchain system, to-be-processed blockchain data, generating a kernel component call request based on a kernel component interface during the processing process of the to-be-processed blockchain data, and calling a kernel component corresponding to the kernel component call request according to the kernel component call request, wherein at least one kernel component is provided; and
    executing, through the kernel component, the kernel component call request to execute processing of a set component function and satisfy a processing requirement for the to-be-processed blockchain data;
    wherein the kernel component comprises at least one of: a contract component, a network component, a consensus component, a ledger component, a permission component, or a cryptography component;
    wherein the to-be-processed blockchain data comprises at least one of: a to-be-processed blockchain transaction request, a to-be-verified block, a to-be-synchronized block or blockchain system maintenance data;
    wherein the generating, through the kernel engine, the kernel component call request based on the kernel component interface during the processing process, calling the kernel component according to the kernel component call request, and executing, through the kernel component, the kernel component call request to execute the processing of the set component function comprises:
    generating, through the kernel engine, a deal check request based on a deal check interface according to the to-be-processed blockchain transaction request, and calling the ledger component according to the deal check request;
    performing, through the ledger component, ledger check on to-be-checked ledger data according to the deal check request, and feeding back a ledger check result to the kernel engine;
    after the ledger check is successful, generating, through the kernel engine, a deal execution request based on a deal execution interface, and calling the ledger component according to the deal execution request;
    executing, through the ledger component, the to-be-processed blockchain transaction request according to the deal execution request, forming deal data, and adding the deal data to an unconfirmed transaction pool;
    in a case where a native node is a miner of a current block, generating, through the kernel engine, a deal packaging request based on a block packaging interface, and calling the ledger component according to the deal packaging request;
    confirming, through the ledger component, to-be-packaged deal data from an unconfirmed deal pool according to the deal packaging request, and packaging the to-be-packaged deal data to form a block and feeding back the block to the kernel engine;
    generating, through the kernel engine, a block signature request based on a signature interface, and calling the cryptography component according to the block signature request;
    performing, through the cryptography component, signature processing on the packaged block according to the block signature request, and feeding back the signature-processed packaged block to the kernel engine;
    generating, through the kernel engine, a block update request based on a block update interface, and calling the ledger component according to the block update request;
    writing, through the ledger component, the signature-processed packaged block into a local ledger of the native node according to the block update request;
    generating, through the kernel engine, a block broadcast request based on a block broadcast interface, and calling the network component according to the block broadcast request; and
    transmitting, through the network component, the signature-processed packaged block into a blockchain network according to the block broadcast request.

2. The method according to claim 1, wherein the executing, through the kernel component, the kernel component call request to execute the processing of the set component function comprises:
    executing, through the kernel component, the kernel component call request, generating a basic component call request based on a basic component interface in a process of processing the kernel component call request, and calling a basic component corresponding to the basic component call request according to the basic component call request, wherein at least one basic component is provided; and implementing, through the kernel component, the processing of the set component function according to a basic component processing result fed back by the basic component.

3. The method according to claim 2, wherein the basic component comprises at least one of: a basic storage component, a peer-to-peer network component, a cryptography library component, a codec component or a log library component.

4. The method according to claim 1, further comprising:
acquiring, through the kernel engine of the blockchain system, the to-be-processed blockchain transaction request initiated by an application layer of a native node as the to-be-processed blockchain data; or
receiving, through the network component of the kernel component, the to-be-verified block, the to-be-synchronized block or blockchain system maintenance data transmitted in the blockchain network as the to-be-processed blockchain data.

5. The method according to claim 4, wherein the acquiring, through the kernel engine of the blockchain system, the to-be-processed blockchain transaction request initiated by the application layer of the native node comprises:
monitoring, through an access service unit of the blockchain system, a network interaction port of a client of the application layer;
in a case where a submission instruction of the to-be-processed blockchain transaction request is monitored through the access service unit, generating a request processing instruction, and transmitting the request processing instruction to a request submission interface of the kernel engine; and
receiving, through the kernel engine, the request processing instruction, and acquiring the to-be-processed blockchain transaction request according to the request processing instruction.

6. The method according to claim 1, wherein the generating, through the kernel engine, the kernel component call request based on the kernel component interface during the processing process, and calling the kernel component according to the kernel component call request comprises:
determining, through the kernel engine, a to-be-called kernel component interface based on a component adaptor during the processing process; and
generating, through the kernel engine, the kernel component call request based on the to-be-called kernel component interface, and calling the kernel component corresponding to the kernel component call request according to the kernel component call request.

7. The method according to claim 1, wherein the kernel component call request comprises at least one of:
the deal check request, the deal execution request, the deal packaging request, the block signature request, the block update request, the block broadcast request, a miner query request, a contract call request, a signature check request or a block check request.

8. The method according to claim 1, wherein the generating, through the kernel engine, the kernel component call request based on the kernel component interface during the processing process, calling the kernel component according to the kernel component call request, and executing, through the kernel component, the kernel component call request to execute the processing of the set component function comprises:
continuously generating, through the kernel engine, a miner query request according to a set rule based on a miner query interface, and calling the consensus component according to the miner query request; and
querying, through the consensus component, whether the native node is the miner of the current block according to the miner query request, and feeding back a miner query result to the kernel engine.

9. The method according to claim 1, wherein generating, through the kernel engine, the kernel component call request based on the kernel component interface during the processing process, calling the kernel component according to the kernel component call request, and executing, through the kernel component, the kernel component call request to execute the processing of the set component function comprises:
generating, through the kernel engine, the contract call request based on a contract call interface, and calling the contract component according to the contract call request; and
operating, through the contract component, the smart contract virtual machine according to the contract call request, processing the to-be-processed blockchain transaction request, and feeding back a contract processing result to the kernel engine.

10. The method according to claim 1, wherein the generating, through the kernel engine, the kernel component call request based on the kernel component interface during the processing process, calling the kernel component according to the kernel component call request, and executing, through the kernel component, the kernel component call request to execute the processing of the set component function comprises:
in a case where the to-be-verified block transmitted in the blockchain network is monitored through the network component, feeding back the to-be-verified block to the kernel engine;
generating, through the kernel engine, a miner query request based on a miner query interface, and calling the consensus component according to the miner query request;
querying, through the consensus component, a miner of the to-be-verified block according to the miner query request, and feeding back a miner query result to the kernel engine;
generating, through the kernel engine, a signature check request based on a signature check interface, and calling the cryptography component according to the signature check request;
performing, through the cryptography component, signature check processing on the to-be-verified block according to the signature check request, and feeding back a signature check result to the kernel engine;
generating, through the kernel engine, a block check request based on a block check interface according to the to-be-verified block, and calling the ledger component according to the block check request; and
checking, through the ledger component, the to-be-verified block according to the block check request, and writing the to-be-verified block into the local ledger of the native node in a case where the check is successful.

11. An electronic device, comprising:
at least one processor; and
a memory communicatively connected to the at least one processor;
wherein the memory stores instructions executable by the at least one processor to cause the at least one processor to perform:

processing, through a kernel engine of a blockchain system, to-be-processed blockchain data, generating a kernel component call request based on a kernel component interface during the processing process of the to-be-processed blockchain data, and calling a kernel component corresponding to the kernel component call request according to the kernel component call request, wherein at least one kernel component is provided; and executing, through the kernel component, the kernel component call request to execute processing of a set component function and satisfy a processing requirement for the to-be-processed blockchain data;

wherein the kernel component comprises at least one of: a contract component, a network component, a consensus component, a ledger component, a permission component, or a cryptography component;

wherein the to-be-processed blockchain data comprises at least one of: a to-be-processed blockchain transaction request, a to-be-verified block, a to-be-synchronized block or blockchain system maintenance data;

wherein the generating, through the kernel engine, the kernel component call request based on the kernel component interface during the processing process, calling the kernel component according to the kernel component call request, and executing, through the kernel component, the kernel component call request to execute the processing of the set component function comprises:

generating, through the kernel engine, a deal check request based on a deal check interface according to the to-be-processed blockchain transaction request, and calling the ledger component according to the deal check request;

performing, through the ledger component, ledger check on to-be-checked ledger data according to the deal check request, and feeding back a ledger check result to the kernel engine;

after the ledger check is successful, generating, through the kernel engine, a deal execution request based on a deal execution interface, and calling the ledger component according to the deal execution request;

executing, through the ledger component, the to-be-processed blockchain transaction request according to the deal execution request, forming deal data, and adding the deal data to an unconfirmed transaction pool;

in a case where a native node is a miner of a current block, generating, through the kernel engine, a deal packaging request based on a block packaging interface, and calling the ledger component according to the deal packaging request;

confirming, through the ledger component, to-be-packaged deal data from an unconfirmed deal pool according to the deal packaging request, and packaging the to-be-packaged deal data to form a block and feeding back the block to the kernel engine;

generating, through the kernel engine, a block signature request based on a signature interface, and calling the cryptography component according to the block signature request;

performing, through the cryptography component, signature processing on the packaged block according to the block signature request, and feeding back the signature-processed packaged block to the kernel engine;

generating, through the kernel engine, a block update request based on a block update interface, and calling the ledger component according to the block update request;

writing, through the ledger component, the signature-processed packaged block into a local ledger of the native node according to the block update request;

generating, through the kernel engine, a block broadcast request based on a block broadcast interface, and calling the network component according to the block broadcast request; and transmitting, through the network component, the signature-processed packaged block into a blockchain network according to the block broadcast request.

12. The electronic device according to claim 11, wherein the executing, through the kernel component, the kernel component call request to execute the processing of the set component function comprises:

executing, through the kernel component, the kernel component call request, generating a basic component call request based on a basic component interface in a process of processing the kernel component call request, and calling a basic component corresponding to the basic component call request according to the basic component call request, wherein at least one basic component is provided; and implementing, through the kernel component, the processing of the set component function according to a basic component processing result fed back by the basic component.

13. The electronic device according to claim 12, wherein the basic component comprises at least one of: a basic storage component, a peer-to-peer network component, a cryptography library component, a codec component or a log library component.

14. The electronic device according to claim 11, further comprising:

acquiring, through the kernel engine of the blockchain system, the to-be-processed blockchain transaction request initiated by an application layer of a native node as the to-be-processed blockchain data; or receiving, through the network component of the kernel component, the to-be-verified block, the to-be-synchronized block or blockchain system maintenance data transmitted in the blockchain network as the to-be-processed blockchain data.

15. A non-transitory computer-readable storage medium storing computer instructions for causing a computer to perform: processing, through a kernel engine of a blockchain system, to-be-processed blockchain data, generating a kernel component call request based on a kernel component interface during the processing process of the to-be-processed blockchain data, and calling a kernel component corresponding to the kernel component call request according to the kernel component call request, wherein at least one kernel component is provided; and executing, through the kernel component, the kernel component call request to execute processing of a set component function and satisfy a processing requirement for the to-be-processed blockchain data;

wherein the kernel component comprises at least one of: a contract component, a network component, a consensus component, a ledger component, a permission component, or a cryptography component;

wherein the to-be-processed blockchain data comprises at least one of: a to-be-processed blockchain transaction request, a to-be-verified block, a to-be-synchronized block or blockchain system maintenance data;

wherein the generating, through the kernel engine, the kernel component call request based on the kernel component interface during the processing process, calling the kernel component according to the kernel component call request, and executing, through the kernel component, the kernel component call request to execute the processing of the set component function comprises:

generating, through the kernel engine, a deal check request based on a deal check interface according to the to-be-processed blockchain transaction request, and calling the ledger component according to the deal check request;

performing, through the ledger component, ledger check on to-be-checked ledger data according to the deal check request, and feeding back a ledger check result to the kernel engine;

after the ledger check is successful, generating, through the kernel engine, a deal execution request based on a deal execution interface, and calling the ledger component according to the deal execution request;

executing, through the ledger component, the to-be-processed blockchain transaction request according to the deal execution request, forming deal data, and adding the deal data to an unconfirmed transaction pool;

in a case where a native node is a miner of a current block, generating, through the kernel engine, a deal packaging request based on a block packaging interface, and calling the ledger component according to the deal packaging request;

confirming, through the ledger component, to-be-packaged deal data from an unconfirmed deal pool according to the deal packaging request, and packaging the to-be-packaged deal data to form a block and feeding back the block to the kernel engine;

generating, through the kernel engine, a block signature request based on a signature interface, and calling the cryptography component according to the block signature request;

performing, through the cryptography component, signature processing on the packaged block according to the block signature request, and feeding back the signature-processed packaged block to the kernel engine;

generating, through the kernel engine, a block update request based on a block update interface, and calling the ledger component according to the block update request;

writing, through the ledger component, the signature-processed packaged block into a local ledger of the native node according to the block update request;

generating, through the kernel engine, a block broadcast request based on a block broadcast interface, and calling the network component according to the block broadcast request; and transmitting, through the network component, the signature-processed packaged block into a blockchain network according to the block broadcast request.

* * * * *